(12) United States Patent
Fukamizu et al.

(10) Patent No.: US 7,535,188 B2
(45) Date of Patent: May 19, 2009

(54) MOTOR DRIVING APPARATUS, MOTOR DRIVING METHOD AND DISK DRIVING APPARATUS

(75) Inventors: Shingo Fukamizu, Osaka (JP); Yasunori Yamamoto, Osaka (JP); Shinichi Kuroshima, Osaka (JP)

(73) Assignee: Panasonic Corporation, Osaka (JP)

( * ) Notice: Subject to any disclaimer, the term of this patent is extended or adjusted under 35 U.S.C. 154(b) by 121 days.

(21) Appl. No.: 11/679,939

(22) Filed: Feb. 28, 2007

(65) Prior Publication Data

US 2007/0229004 A1  Oct. 4, 2007

(30) Foreign Application Priority Data

Feb. 28, 2006  (JP)  ............... 2006-052622

(51) Int. Cl.
  *H02P 25/08*  (2006.01)
(52) U.S. Cl. .................... 318/254.1; 318/799; 318/811; 318/400.01
(58) Field of Classification Search ................. 318/799, 318/811, 400.01, 254.1
  See application file for complete search history.

(56) References Cited

U.S. PATENT DOCUMENTS

| | | | |
|---|---|---|---|
| 4,641,066 A * | 2/1987 | Nagata et al. | 318/400.37 |
| 4,949,021 A * | 8/1990 | Rozman et al. | 318/400.11 |
| 5,402,053 A * | 3/1995 | Divan et al. | 318/768 |
| 5,512,811 A * | 4/1996 | Latos et al. | 322/10 |
| 5,581,168 A * | 12/1996 | Rozman et al. | 318/723 |
| 5,818,179 A * | 10/1998 | Kokami et al. | 318/400.04 |
| 5,834,911 A * | 11/1998 | Kimura | 318/400.11 |
| 6,433,496 B1 * | 8/2002 | Kawagoshi | 318/400.05 |
| 6,946,808 B2 * | 9/2005 | Kandori | 318/400.33 |
| 7,102,312 B2 * | 9/2006 | Suzuki et al. | 318/400.05 |
| 2003/0102832 A1 | 6/2003 | Iwanaga et al. | |
| 2004/0056628 A1 | 3/2004 | Kandori | |

FOREIGN PATENT DOCUMENTS

| | | |
|---|---|---|
| EP | 0251785 A | 1/1988 |
| JP | 63-069489 | 3/1988 |
| JP | 4-046583 | 2/1992 |
| JP | 7-83628 B | 9/1995 |
| JP | 2547778 B | 8/1999 |
| JP | 2003-174789 | 6/2003 |
| JP | 1318595 A | 6/2003 |
| JP | 2004-104846 | 4/2004 |

* cited by examiner

*Primary Examiner*—Bentsu Ro
*Assistant Examiner*—David S Luo
(74) *Attorney, Agent, or Firm*—RatnerPrestia

(57) ABSTRACT

A motor driving apparatus includes a neutral point difference voltage detecting unit operable to detect a difference voltage between a virtual neutral point of a resistor circuit connected in parallel to motor coils and an actual neutral point which is a common connection point of the motor coils, a rotor position detecting unit operable to detect a position of the rotor based on the difference voltage, and a controller operable to control commutation of an inverter. A rotation start torque applying process applies a rotation start pulse for providing rotation torque to the rotor based on a determined rotor position.

26 Claims, 24 Drawing Sheets

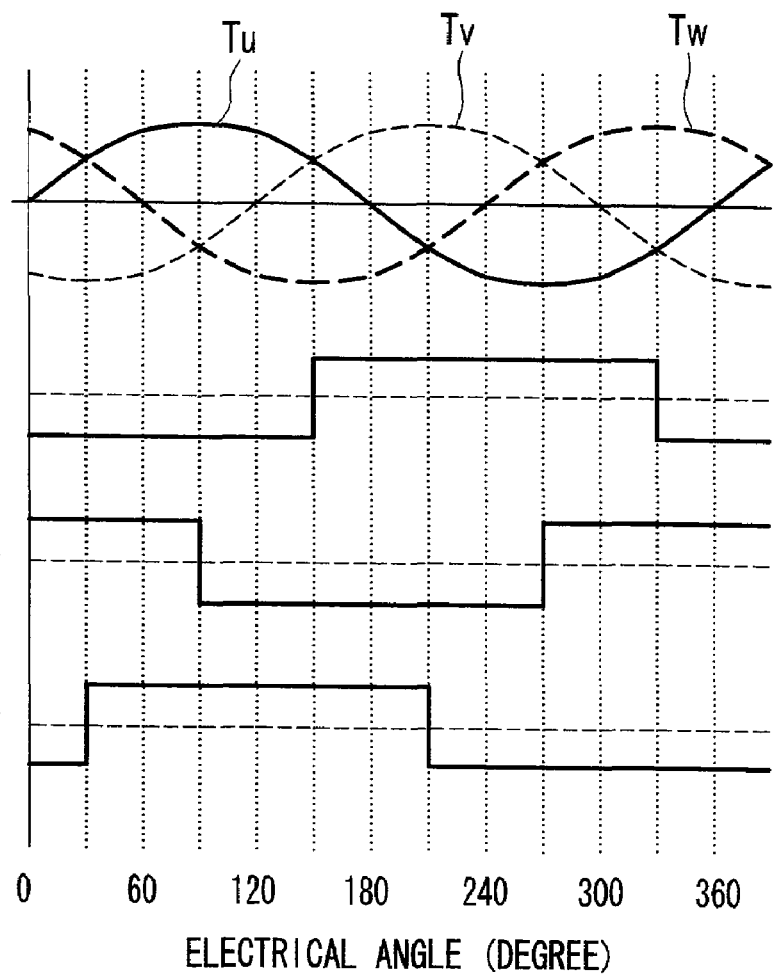

Fig.8A

|  | ⟨1⟩ | | ⟨2⟩ | | ⟨3⟩ | |
| --- | --- | --- | --- | --- | --- | --- |
| DIRECTION OF CURRENT PULSE | U⇒V | V⇒U | V⇒W | W⇒V | W⇒U | U⇒W |
| DIFFERENCE VOLTAGE AT NEUTRAL POINT DIFFERENCE VOLTAGE DETECTOR | ΔVc1 | ΔVc2 | ΔVc3 | ΔVc4 | ΔVc5 | ΔVc6 |
| VALUE OF E1, E2 AND E3 | E1 = ΔVc1+ΔVc2 | | E2 = ΔVc3+ΔVc4 | | E3 = ΔVc5+ΔVc6 | |

Fig.8B

|  | ⟨1⟩ | ⟨2⟩ | ⟨3⟩ | ⟨4⟩ | ⟨5⟩ | ⟨6⟩ |
| --- | --- | --- | --- | --- | --- | --- |
| POLARITY OF E1 | − ⇒ + | + | + | + ⇒ − | − | − |
| POLARITY OF E2 | ⇒ − | − | − ⇒ + | + | + | + ⇒ |
| POLARITY OF E3 | + | + ⇒ − | − | − | − ⇒ + | + |
| ROTOR POSITION DETECTED BY ROTOR POSITION DETERMINATION UNIT | 120° | 180° | 240° | 300° | 0° (360°) | 60° |
| START CONDUCTION PHASE OF RATATION START PULSE | U⇒W | V⇒W | V⇒U | W⇒U | W⇒V | U⇒V |

⟶ ORDER OF FORWARD ROTATION

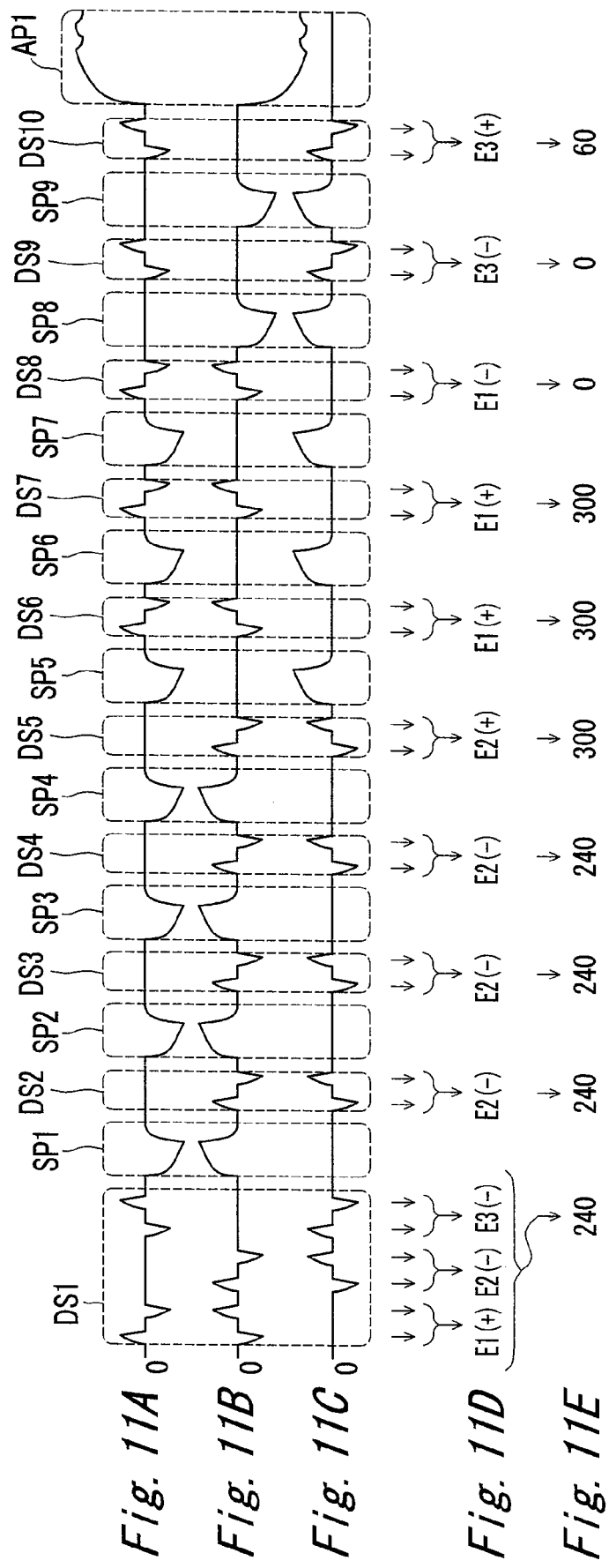

Fig. 12A

Fig. 12B

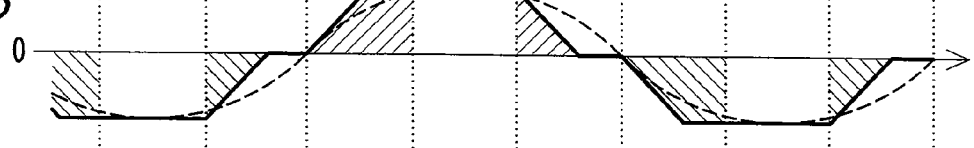

Fig. 12C

I  II  III  IV  V  VI

Fig. 12D

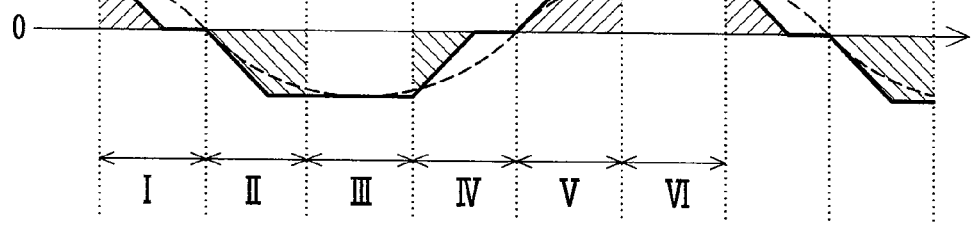

| | I | II | III | IV | V | VI |
|---|---|---|---|---|---|---|
| U-PHASE | SOURCE INCREASE | SOURCE FIXED TO ON | SOURCE DECREASE | SINK INCREASE | SINK FIXED TO ON | SINK DECREASE |
| V-PHASE | SINK FIXED TO ON | SINK DECREASE | SOURCE INCREASE | SOURCE FIXED TO ON | SOURCE DECREASE | SINK INCREASE |
| W-PHASE | SOURCE DECREASE | SINK INCREASE | SINK FIXED TO ON | SINK DECREASE | SOURCE INCREASE | SOURCE FIXED TO ON |
| ZERO CROSS DETECTION | W↓ | V↑ | U↓ | W↑ | V↓ | U↑ |

ELECTRICAL ANGLE (DEGREE)

ELECTRICAL ANGLE (DEGREE)

Fig.17A

|  | ⟨1⟩ | ⟨2⟩ | ⟨3⟩ | ⟨4⟩ | ⟨5⟩ | ⟨6⟩ |
|---|---|---|---|---|---|---|
| E1 (0/1 DETERMINATION) ×1 | 0×1 | 1×1 | 1×1 | 1×1 | 0×1 | 0×1 |
| E2 (0/1 DETERMINATION) ×2 | 0×2 | 0×2 | 0×2 | 1×2 | 1×2 | 1×2 |
| E3 (0/1 DETERMINATION) ×4 | 1×4 | 1×4 | 0×4 | 0×4 | 0×4 | 1×4 |
| SUM OF POLARITY DETERMINATIONS | 4 | 5 | 1 | 3 | 2 | 6 |
| START CONDUCTION PHASE OF ROTATION START PULSE | U⇒W | V⇒W | V⇒U | W⇒U | W⇒V | U⇒V |

ORDER OF FORWARD ROTATION →

Fig.17B

|  | ⟨1⟩ | ⟨2⟩ | ⟨3⟩ | ⟨4⟩ | ⟨5⟩ | ⟨6⟩ |
|---|---|---|---|---|---|---|
| E1 (−1/1 DETERMINATION) ×1 | −1×1 | 1×1 | 1×1 | 1×1 | −1×1 | −1×1 |
| E2 (−1/1 DETERMINATION) ×2 | −1×2 | −1×2 | −1×2 | 1×2 | 1×2 | 1×2 |
| E3 (−1/1 DETERMINATION) ×4 | 1×4 | 1×4 | −1×4 | −1×4 | −1×4 | 1×4 |
| SUM OF POLARITY DETERMINATIONS | 1 | 3 | −5 | −1 | −3 | 5 |
| SUM + α (5) | 6 | 8 | 0 | 4 | 2 | 10 |
| START CONDUCTION PHASE OF ROTATION START PULSE | U⇒W | V⇒W | V⇒U | W⇒U | W⇒V | U⇒V |

ORDER OF FORWARD ROTATION →

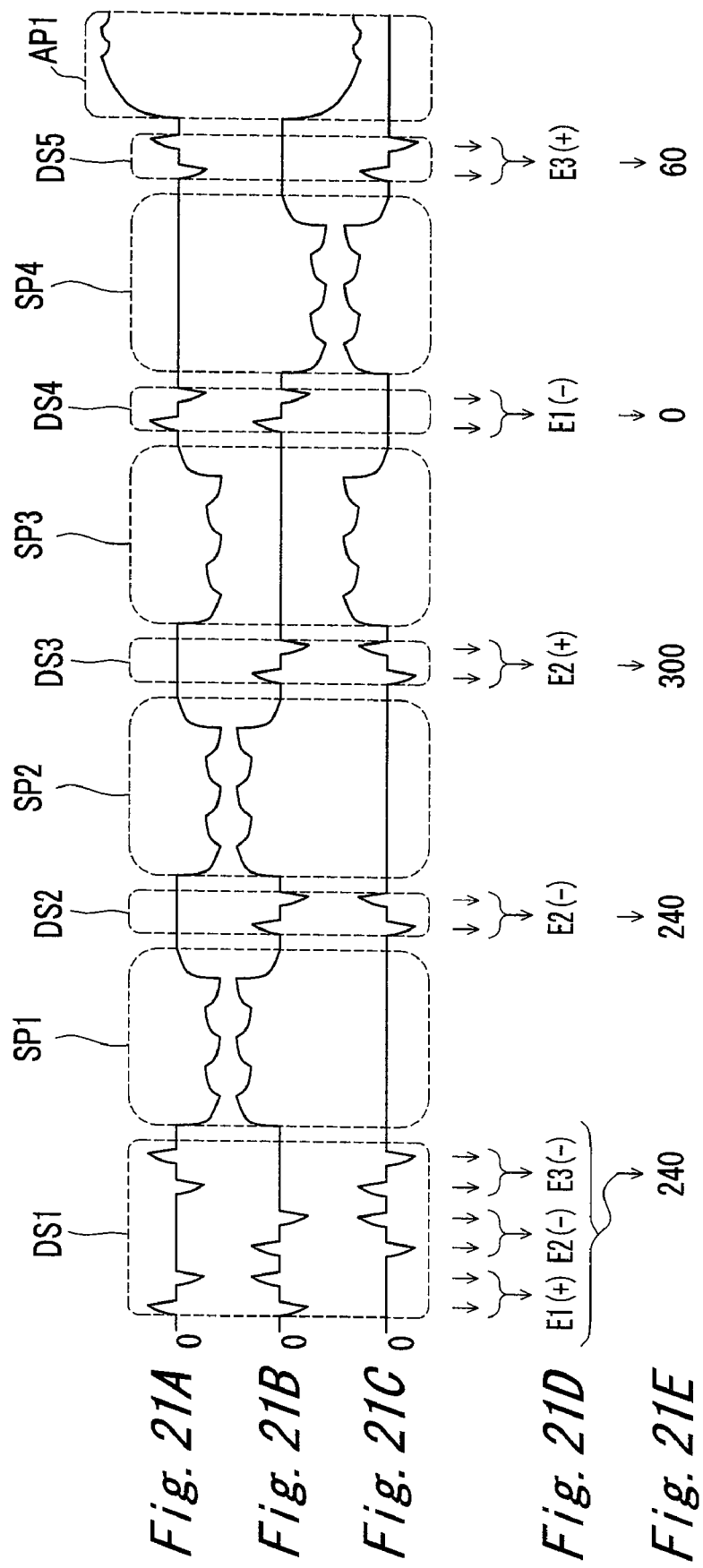

MOTOR DRIVING APPARATUS, MOTOR DRIVING METHOD AND DISK DRIVING APPARATUS

BACKGROUND ART

1. Field of the Invention

The present invention relates to a motor driving apparatus and a motor driving method which enable start of a motor without use of a sensor for detecting a rotor position.

2. Related Art

In driving of a brushless motor, it is necessary to obtain an electrical relative position of a rotor to a stator in order to select an appropriate phase of the stator for supplying a current to apply a stable torque to the rotor. A variety of rotor position sensors are used for obtaining an electrical relative position of the rotor to the stator. Meanwhile, a sensorless driving technique which requires no rotor position sensor is under development from the viewpoint of reliability, an increase in cost, and environmental resistance.

In such a sensorless driving technique, it is generally known that a rotor position is detected by reading a back electromotive voltage generated in the motor coil during rotation of the rotor. However, the back electromotive voltage is not generated during stoppage of the rotor, and hence a variety of methods have been proposed as rotor position detecting methods during stoppage of the rotor.

For example, Japanese Patent No. 2547778 shows a method of applying an initial position detection pulse as a pulse for detecting an initial position of a rotor, while sequentially selecting phases of a stator, to detect a rotor position from a phase where a current of a maximum value is flowing at the moment.

Further, in JP-A-07-83628, a rotor position is obtained in the following manner. Phases of a stator are sequentially selected, and a rotor position search pulse is applied thereto. At that time, voltages that appear at a neutral point of motor coils are divided into a first measured voltage group showing measured voltage values close to a third of a power supply voltage value and a second measured voltage group showing measured voltage values close to two thirds of the power supply voltage, and each of the voltage values are then stored. From the storage data of each measured value, a difference between the minimum absolute voltage value and the maximum absolute voltage value of each of the voltage groups is obtained. The obtained difference voltages of the respective groups are compared with each other, and the rotor position is determined on the basis of a conduction pattern in which a larger difference voltage is obtained.

Further, according to a motor driving apparatus disclosed in JP-A-2004-104846, phases of a stator are sequentially selected and a rotor position search pulse is applied to each selected phase. A neutral point voltage of motor coils, which is generated in flowing of the rotor position search pulse current, is inputted into a detection circuit for detecting a rotor position. As thus described, the method is shown for determining the rotor position on the basis of reference data of the neutral point voltage for rotor position determination. Further, in the detection circuit, a detection level is shifted to a level according to a drive signal for rotor position detection, and comparison by a comparator between the shifted detection level and the neutral point voltage of the motor coils is outputted and then stored, to determine the rotor position on the basis of the comparison between the stored data and reference data of variations in neutral point voltage for rotor position determination.

Since in the brushless motor, vibration, noise and rotational variations have to be suppressed by devising structure of the motor, a variety of motors with magnets of rotors magnetized by varied methods, cores in varied shapes, or other elements varied, have appeared in the market. A motor driving apparatus for driving such motors is required to reliably start the motors.

In the above-mentioned conventional method, the mode is shifted from the rotor position searching process to an operational mode for driving the motor while detecting a back electromotive voltage (hereinafter referred to as "back electromotive voltage mode"). Therefore, when the initial position has not been successfully detected in the rotor position searching process, the motor remains stopped. Moreover, when the detected initial position is inaccurate, appropriate initial acceleration has not been given to the motor to shift the mode to the back electromotive voltage detection mode, which might cause occurrence of erroneous operation (reversal etc.) due to starting failure.

The present invention is directed to solve the above-mentioned problems, and has an object to provide a motor driving apparatus which enables more reliable start of a motor.

SUMMARY OF THE INVENTION

According to the present invention, during a searching start mode, in order to detect a rotor position, a rotor position search pulse in two-phase conduction is applied in forward and backward directions to detect neutral point difference voltages each of which is a difference voltage between an actual neutral point and a virtual neutral point. Response signals of the neutral point difference voltages in the forward and backward directions are added (synthesized) and polarity of the added result is determined. Here, the actual neutral point is a neutral point of motor coils, and a virtual neutral point is a node to provide a voltage obtained by averaging motor terminal voltages, which can be realized, for example, by a common connection point of resistors connected in parallel to the motor coils. Such search for the rotor position by conduction of the rotor position search pulse is repeated in a predetermined number of times, and the rotor position is then determined according to the predetermined number of polarity determination results.

Namely, when conduction phases are sequentially selected and energized, response signal potential differences, with reference to the voltage at the virtual neutral point, each obtained from variations in voltage at the actual neutral point due to application of the rotor position search pulse, are stored. The stored data are added and a polarity of the added result is determined.

Next, conduction phases at the start of the motor are determined on the basis of the polarity determination, and motor starting conduction is performed according to the determination. In this case, the mode is not directly shifted from the searching start mode to the back electromotive voltage feedback mode, but the mode is shifted to the back electromotive voltage feedback mode through a process of applying an appropriate rotational speed to the initial start of the motor.

On this account, in the searching start mode, a "rotor position searching process" for detecting a neutral point difference voltage to search the rotor position and a "rotation start torque applying process" for applying a starting torque are alternately performed. In detection of the neutral point difference voltage in the rotor position searching process, it is possible to use the characteristic of serving as rotor position information where a response signal of the neutral point difference voltage includes no back electromotive voltage at an appropriate rotational speed of the initial start of the motor, so as to detect accurate rotor position information.

Specifically, the motor driving apparatus according to the present invention has a configuration as follows.

A motor driving apparatus according to the invention has the following configuration.

The motor driving apparatus according to the invention includes: a virtual neutral point unit that has a virtual neutral point and provides a voltage obtained by averaging motor terminal voltages at the virtual neutral point; an inverter comprising a plurality of switching elements; a back electromotive voltage detecting unit operable to detect a back electromotive voltage of the motor; a neutral point difference voltage detecting unit operable to detect a neutral point difference voltage which is a difference voltage between the virtual neutral point and an actual neutral point which is a common connection point of the motor coils; a rotor position detecting unit operable to detect a position of the rotor on the basis of the neutral point difference voltage; and a controller operable to control commutation of the inverter.

The controller has, as operational modes, a searching start mode for determining conduction phases at the start of the motor on the basis of the detection result by the rotor position detecting unit and energizes the coils of the determined conduction phases; and a back electromotive voltage feedback mode for controlling commutation on the basis of the back electromotive voltage detected by the back electromotive voltage detecting unit.

In the searching start mode, a rotor position searching process and a rotation start torque applying process are alternately performed. The rotor position searching process applies a search pulse for detecting the rotor position in forward and backward directions of at least a pair of conduction phases to detect neutral point difference voltages, and adds the neutral point difference voltages obtained in the forward and backward directions, to determine the rotor position on the basis of a polarity of the added neutral point difference voltage. The rotation start torque applying process applies a predetermined rotation torque to the rotor on the basis of the rotor position determined by the rotor position searching process.

A motor driving method according to the invention includes: performing a searching start mode which applies a search pulse to the motor coils, determines conduction phases on the basis of a response signal to the applied pulse, and energizes the determined conduction phases; and performing a back electromotive voltage feedback mode which detects a back electromotive voltage generated in the motor, and controls commutation on the basis of the detected back electromotive voltage. The searching start mode alternately performs a rotor position searching process and a rotation start torque applying process.

The rotor position searching process applies a search pulse for detecting a rotor position in forward and backward directions of at least a pair of conduction phases, detects each in the forward and backward directions a neutral point difference voltage as a voltage difference between a voltage at a virtual neutral point which is a voltage obtained by averaging motor terminal voltages and a voltage at an actual neutral point which is a common connection point of the motor coils, adds the neutral point difference voltages obtained in the forward and backward directions, and determines the rotor position on the basis of a polarity of the added neutral point difference voltage.

The rotation start torque applying process applies a rotation start pulse for providing a predetermined rotation torque to the rotor on the basis of the rotor position determined by the rotor position searching process.

(Effect of the Invention)

According to the present invention, in a searching start mode as a mode at the start of the motor, a rotor position is determined on the basis of an actual neutral point as a neutral point of motor coils and a virtual neutral point to provide a voltage obtained by averaging motor terminal voltages, to provide an appropriate rotational speed (rotation start torque) at initial start. Since the neutral point difference voltage is not affected by a back electromotive voltage, it is possible by such provision of the neutral point difference voltage to detect rotor position information while being independent of the effect of the back electromotive voltage so that initial start of the motor can be reliably performed. Further, applying sufficient acceleration in the searching start mode allows the mode to smoothly be shifted to a subsequent back electromotive voltage period mode, thus resulting in quick and reliable start of the motor having no rotor position sensor.

Moreover, at the start of the motor, even when the rotor is located at a dead point where the rotor position determination is impossible, a kick pulse for displaying the rotor position can be imparted to resolve the dead point, thus achieving reliable start of the motor.

BRIEF DESCRIPTION OF DRAWINGS

FIGS. 6A to 6C are views showing the relation between the torque constant and the polarity output of results (E1, E2, E3) of adding up neutral point difference voltages with respect to the rotor position shown in FIGS. 5A and 5B.

FIG. 8A is a view showing the relation among the current pulse conducting direction (combination of conduction phases and conducting direction) in rotor position determination which is obtained by a rotor position search pulse in two-phase conduction, the neutral point difference voltage obtained by the neutral point difference voltage detector, and the added neutral point difference voltage value E1, E2, E3. FIG. 8B is a view showing the relation between the polarity determination result of E1, E2, E3 and the start conduction phase of a rotation start pulse on the basis of the polarity determination results E1, E2, E3.

FIGS. 11A to 11E are views showing an example of timing for application of the rotor position search pulse and the rotation start pulse in the first embodiment.

FIGS. 12A to 12C are timing charts showing conduction current waveforms in a sensorless type motor driving apparatus. FIG. 12D is a view showing edge directions of zero-cross detection in cases where a back electromotive voltage generated in a non-conduction phase is detected when a current is conducted through each of the U-phase, the V-phase and W-phase.

FIGS. 17A and 17B are views for explaining another example of a method for setting start conduction phases of a rotation start pulse on the basis of polarity determination results of added neutral point difference voltages E1, E2, E3 in a rotor position detection circuit.

FIGS. 21A to 21E are views explaining application of the rotor position search pulse and the rotation start pulse in a case where the rotation start pulse includes a plurality of pulses.

DETAIL DESCRIPTION OF THE PREFERRED EMBODIMENT

In the following, specific embodiments of a motor driving apparatus and a motor driving method according to the present invention are described with reference to drawings.

Embodiment 1

1. Configuration of Motor Driving Apparatus

Figure 1:
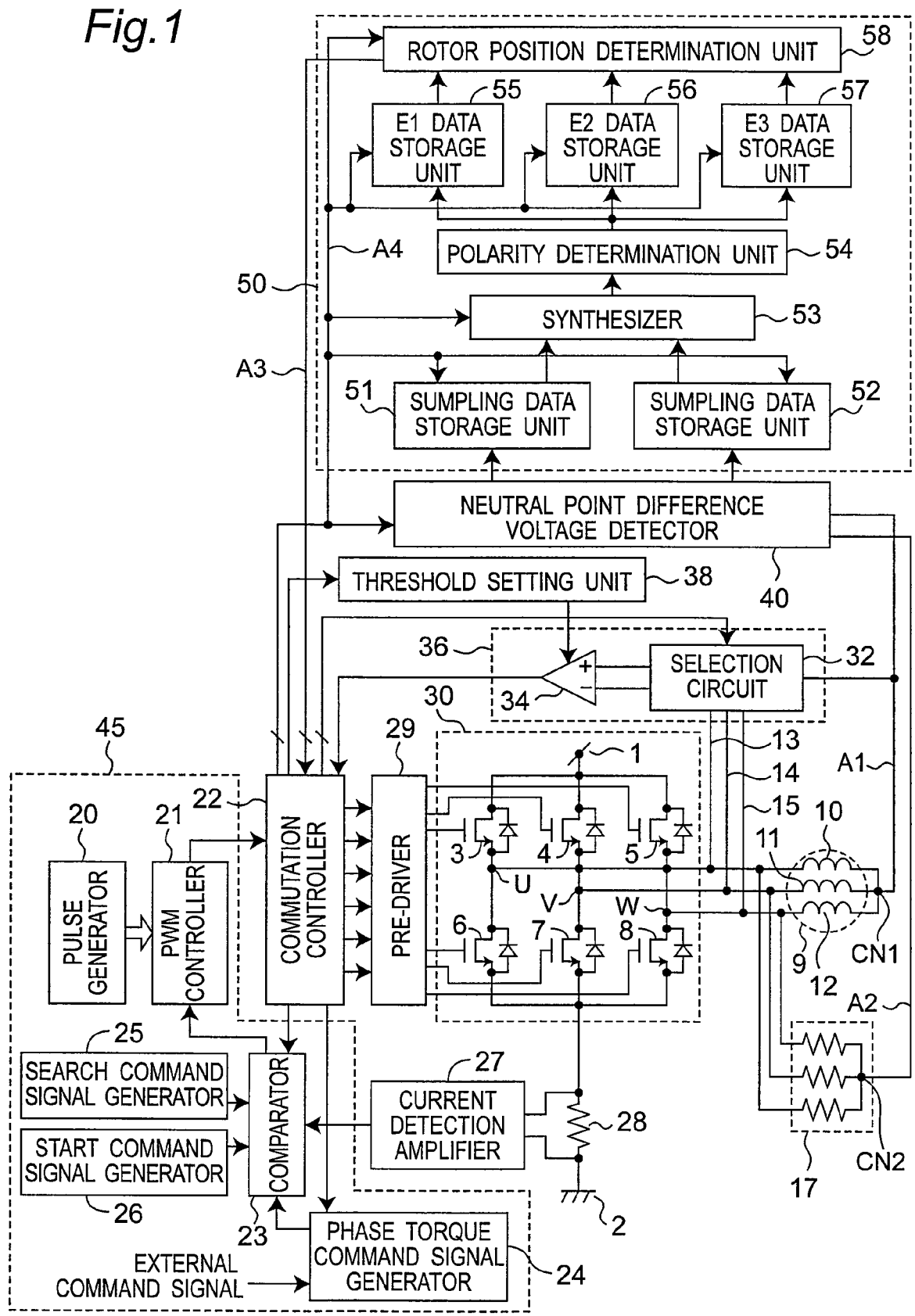
FIG. 1 is a view showing a configuration of a motor driving apparatus according to the present invention.

FIG. 1 shows a circuit configuration of a motor driving apparatus according to the present invention. The motor driving apparatus is a device for driving a motor 9.

The motor 9 includes a stator having coils 10 to 12 of three phases, a U-phase, a V-phase and a W-phase, and a rotor which is rotated by a rotating magnetic field generated in the stator. Although a three-phase motor is used as an example of the motor 9 in the present embodiment, an N-phase motor (N is an integer not smaller than 4) may be used. A U-phase coil 10, a V-phase coil 11 and a W-phase coil 12 have common connection at an actual neutral point CN1.

The motor driving apparatus supplies a drive power of the motor 9, and has an inverter circuit 30 including a plurality of switching elements 3 to 8, a pre-driver 29 for outputting a drive signal of each of the switching elements 3 to 8 in the inverter circuit 30, a commutation controller 22 for outputting to the pre-driver 29 a signal for switching conduction phases as phases of motor coils to be conducted, and a rotor position detecting circuit 50 for determining a rotor position.

Further, the motor driving apparatus has a resistor circuit 17 including resistors connected respectively to the motor coils 10 to 12 of the phases and connected together at a neutral point ("virtual neutral point") CN2, a neutral point difference voltage detector 40 for detecting a neutral point difference voltage as a voltage difference between the neutral point ("actual neutral point") CN1 of the motor coils and the virtual neutral point CN2 of the resistor circuit 17, a back electromotive voltage detector 36 for detecting a back electromotive voltage of the motor coil, a threshold setting unit 38 for setting a threshold for detecting the back electromotive voltage, and a PWM signal generator 45 for outputting to the commutation controller 22 a signal with the pulse width controlled. The resistor circuit 17 is a circuit to provide a voltage obtained by averaging motor terminal voltages, and may be alternated by another circuit having the same function. For example, the resistor circuit 17 may include further element other than the resistor if having the function of giving a voltage obtained by averaging motor terminal voltages. Alternatively the resistive element may be replaced by another element or circuit in the resistor circuit 17.

A PWM signal generator 45 outputs to the commutation controller 22 a pulse signal having a pulse width controlled, in a peak detection method on the basis of a motor current detected by a current detection resistor 28. The PWM signal generator 45 has a pulse generator 20 for outputting a pulse signal having a predetermined pulse width, a PWM controller 21 for receives the output from the pulse generator 20 as a set signal, a comparator 23 for outputting a reset signal to the PWM controller 21, and a phase torque command signal generator 24 for generating a torque control signal on the basis of an eternal command signal. The PWM signal generator 45 further includes a search command signal generator 25 for setting an amplitude value of a search pulse; and a start command signal generator 26 which sets an amplitude value of a rotation start pulse. A detected value of the motor current, detected by the current detection resistor 28 and amplified by the current detection amplifier 27, is provided to the comparator 23.

A rotor position detection circuit 50 has two sampling data storage units 51 and 52 for storing sampling data of neutral point difference voltage, an synthesizer 53 for adding up (synthesize) the stored sampling data of the neutral point difference voltages, a polarity determination unit 54 for determining a polarity of the added neutral point difference voltages, data storage units 55 to 57 for storing results of the polarity determination, and a rotor position determination unit 58 for determining a rotor position on the basis of the data stored in the data storage units 55 to 57. The rotor position detecting circuit 50 outputs the determined rotor position information to the commutation controller 22.

Figure 2:
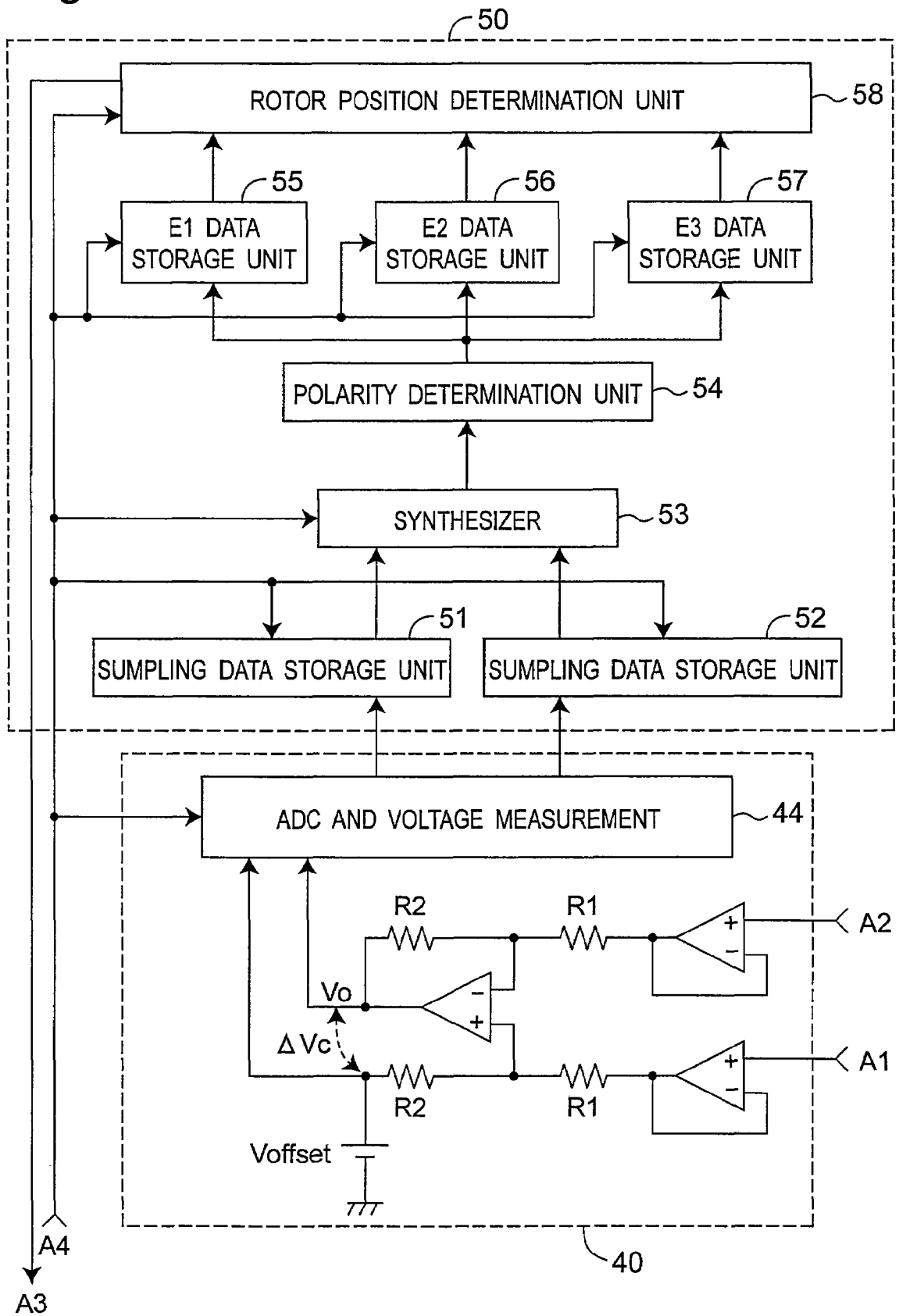
FIG. 2 is a view showing a detailed configuration of a rotor position detection circuit and a neutral point difference voltage detector.

FIG. 2 shows a specific configuration of the neutral point difference voltage detector 40. The neutral point difference voltage detector 40 receives a voltage signal A1 of the actual neutral point CN1 and a voltage signal A2 of the virtual neutral point CN2, and outputs a voltage showing a difference therebetween. As shown in FIG. 2, the neutral point difference voltage detector 40 includes a difference voltage detecting circuit (which includes resistors and amplifiers) having a level shit function, and an ADC (AD converter) and voltage measurement circuit 44.

Figure 3A:
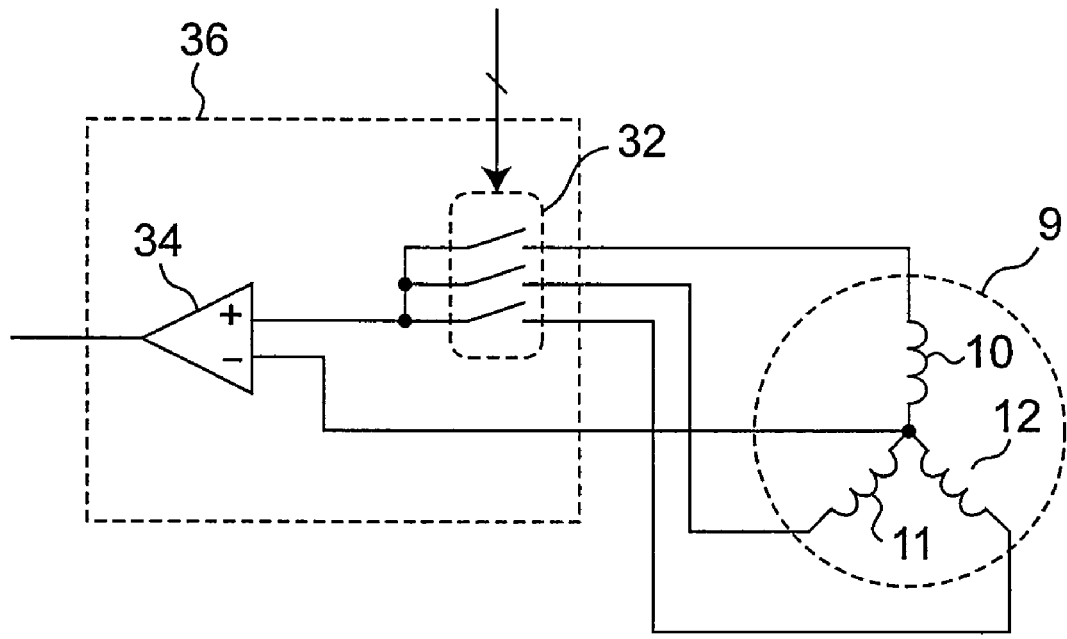
FIGS. 3A and 3B are views showing examples of connection between a back electromotive voltage detector including a comparator and motor coils.

FIG. 3A shows a specific configuration example of the back electromotive voltage detector 36. The back electromotive voltage detector 36 includes a comparator 34 and a selection circuit 32. The selection circuit 32 includes respective switches serially connected to the motor coils 10 to 12. In the selection circuit 32, any of the switches can be selected to detect a back electromotive voltage of any of the U-phase, the V-phase and the W-phase. The switch selection in the selection circuit 32 is controlled by the commutation controller 22 capable of recognizing which phase is a non-conduction phase. In a back electromotive voltage feedback mode, the back electromotive voltage detector 36 reads a back electromotive voltage from a coil terminal of the non-conduction phase through the selection circuit 32. In the back electromotive voltage feedback mode, the comparator 34 is used as a comparator for comparing back electromotive voltages while an absolute value of a threshold of the comparator 34 being reduced or removed. A zero-cross of the back electromotive voltage is detected from a coil terminal of a predetermined non-conduction phase through the selection circuit 32 at timing when the zero-cross is expected to appear.

Figure 3B:
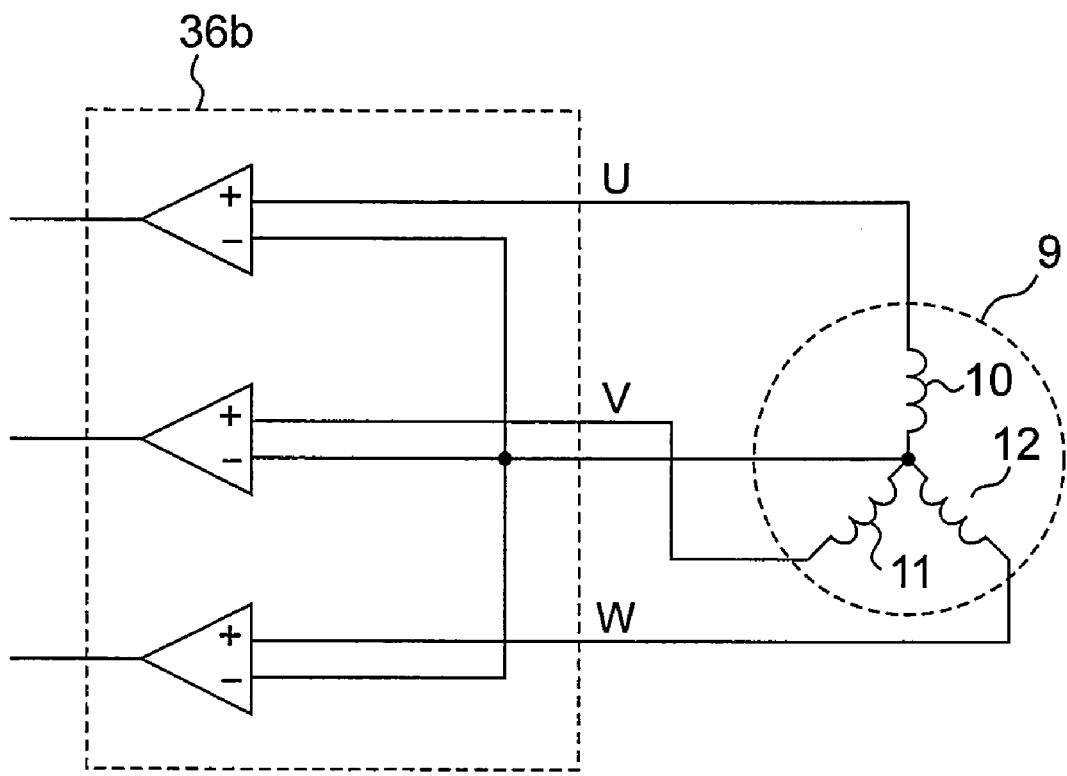

Further, a configuration shown in FIG. 3B can also be thought of as another example of the back electromotive voltage detector. In the back electromotive voltage detector 36 shown in FIG. 3A the phase for detecting the back electromotive voltage is selected by the selection circuit 32. In the back electromotive voltage detector 36b shown in FIG. 3B, each comparator directly reads a back electromotive voltage from the motor coil of the non-conduction phase. Namely, the back electromotive voltage detector 36b has, in each phase, a comparator for detecting the back electromotive voltage from the coil terminal of the non-conduction phase. Also in this case, the comparator is used as a comparator for comparing back electromotive voltages with an absolute value of a threshold of the comparator being reduced or removed in the back electromotive voltage feedback mode.

It is to be noted that, when the two-phase conduction is performed, as a voltage generated in the non-conduction phase (potential difference between the coil terminal and the actual neutral point), there is a voltage generated by a magnetic flux of the rotor across the motor coil due to rotation of the rotor, and a voltage generated by a change in current in the conduction phases with time. In the following description, the former voltage generated by the rotation of the rotor is referred to as a "back electromotive voltage", and the latter voltage generated by the current change is referred to as an "induced voltage".

2. Operation of Motor Driving Apparatus

The operation of the motor driving apparatus having the above-mentioned configuration is described as follows. It is to be noted that in the following description, the direction of "U-phase→V-phase→W-phase→U-phase . . . " is referred to as a forward direction. The motor driving apparatus of the present embodiment has the "searching start mode" for accelerating the motor while searching a motor position, and the "back electromotive voltage feedback mode" for controlling commutation while recognizing the motor position by means of the back electromotive voltage.

Figure 4:
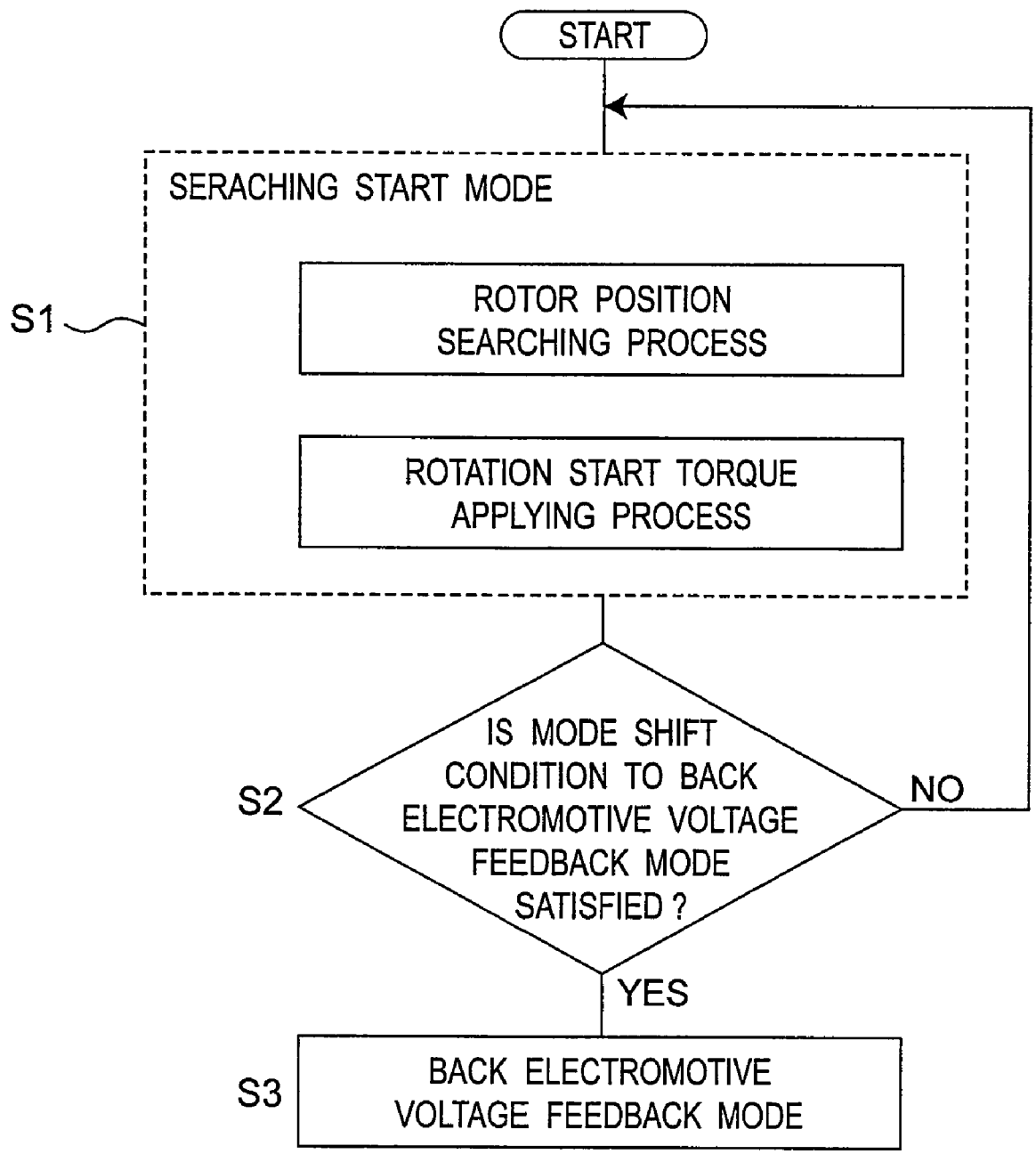
FIG. 4 is a flowchart of the motor driving apparatus at the start operation.

FIG. 4 shows a flowchart of operation of the motor driving apparatus at the start thereof in the present embodiment. The motor driving apparatus operates in the "searching start mode" of accelerating the motor while searching the motor position, in a positional slow rotational region including the start of the motor (S1). The searching start mode includes a "rotor position searching process" for detecting the rotor position, and a "rotation start torque applying process" for applying a rotation torque to the motor at the start thereof. When a condition for a mode shift to the back electromotive voltage feedback mode is satisfied in the searching start mode (S2), the mode is shifted to the "back electromotive voltage feedback mode (S3). The condition for the mode shift to the back electromotive voltage feedback mode is, for example, whether or not the motor speed has reached or exceeds a fixed speed. Namely, in the region where the back electromotive voltage generated by rotation of the rotor can be stably detected to perform commutation control, the motor driving apparatus operates in the back electromotive voltage feedback mode (S3) of controlling commutation while recognizing the motor position by means of the back electromotive voltage.

In the present embodiment, after providing starting acceleration to the motor in the searching start mode, the mode is shifted to the back electromotive voltage feedback mode. In the searching start mode, the rotor position searching process and the rotation start torque applying process are repeated to provide the motor with the initial acceleration. Providing the motor with appropriate initial acceleration for shifting the mode to the back electromotive voltage feedback mode leads to prevention of erroneous detection in zero-cross determination of the back electromotive voltage so as to prevent starting failure, erroneous operation, and the like. Particularly in the present embodiment, in the searching start mode, a difference voltage between the actual neutral point of the motor coils and the virtual neutral point of the resistor circuit provided in parallel with the motor coils is detected, and the motor position is determined on the basis of the detected difference voltage. Since this difference voltage is independent of the effect of the back electromotive voltage, the positional information can be detected only by the characteristic of the induced voltage generated in the motor coil, thereby allowing more accurate determination of the position. Specific operations of the searching start mode and the back electromotive voltage feedback mode are described below.

2-1 Searching Start Mode

When the motor is in the extremely slow rotation region immediately after the start, the driving apparatus operates in the searching start mode (Step S1 in FIG. 4). The searching start mode performs alternately the "rotor position searching process" of applying a rotor position search pulse to the motor coil and searching a rotor position by means of a response signal to the pulse and the "rotation start torque applying process" of providing a rotation start torque to the rotor of which position has been revealed, resulting in acceleration of the start. Those two processes are alternately repeated to accelerate the start. In the searching start mode, the commutation controller 22 selects two terminals out of a U-phase terminal, a V-phase terminal and a W-phase terminal of the three phase coils, to apply the rotor position search pulse between the selected two terminals.

In the following, respective operations of the rotor position searching process and the rotation start torque applying process are specifically described.

2-1-1 Neutral Point Difference Voltage

In the present embodiment, the rotor position is determined on the basis of a neutral point difference voltage as a difference between a voltage at the neutral point (actual neutral point) CN1 of the motor coils and the neutral point (virtual neutral point) CN2 of the resistor circuit 17 connected in parallel to the motor coils 10 to 12.

Figure 5A:
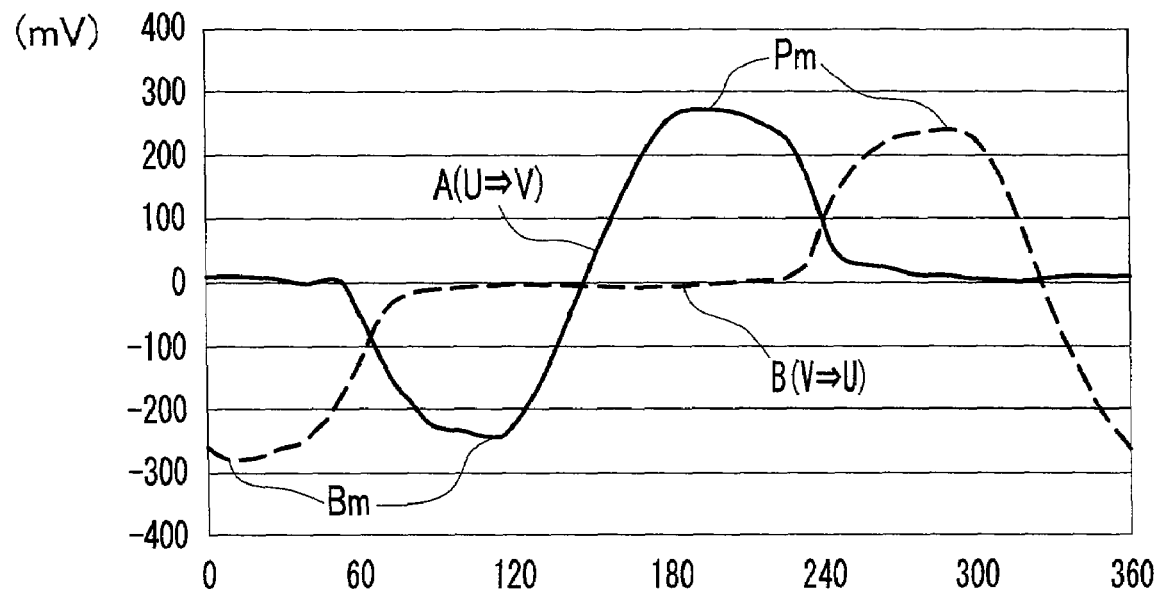
FIG. 5A is a characteristic view showing a measurement result (A) of a response signal of a neutral point difference voltage in application of a rotor position search pulse from U-phase to V-phase (forward direction), and a measurement result (B) of a response signal of a neutral point difference voltage in application of the rotor position search pulse from V-phase to U-phase (backward direction).
Figure 5B:
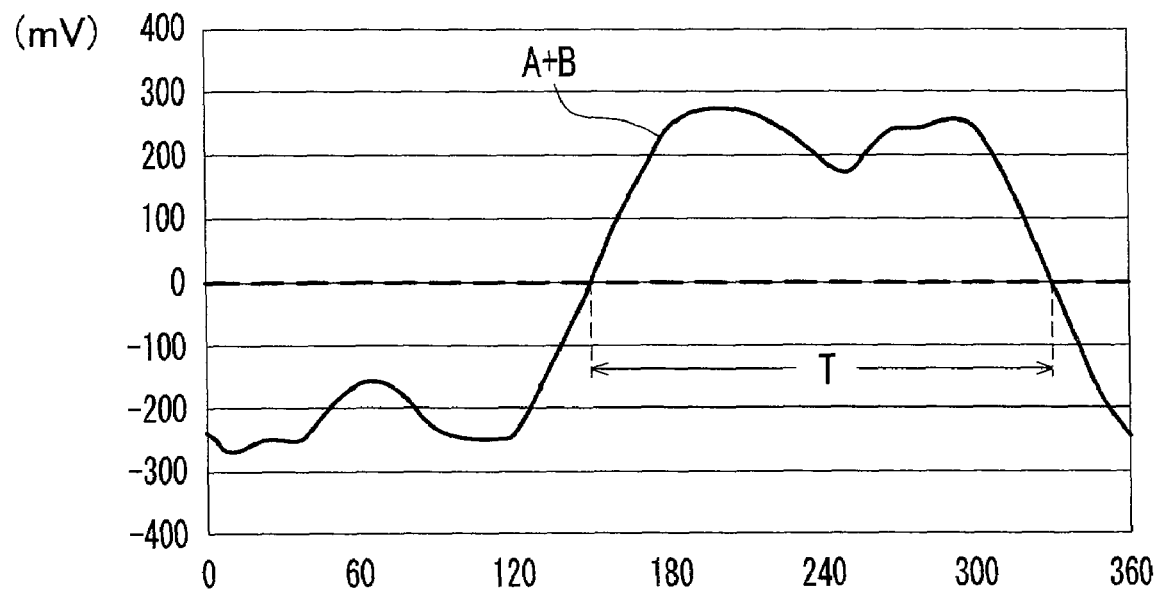
FIG. 5B is a view showing a result of addition of neutral point difference voltages in the forward and backward directions shown in FIG. 5A.

FIGS. 5A and 5B are views showing response of neutral point difference voltages obtained by applying the rotor position search pulses to two phases in a three-phase brushless motor. In the figure, the neutral point difference voltage as a difference voltage between a voltage at the virtual neutral point CN2 and a voltage generated at the actual neutral point CN1 is plotted in the relative position of the rotor to the stator.

FIG. 5A shows a waveform of neutral point difference voltage measured upon application of the rotor position search pulse in two-phase conduction. The ordinate represents the neutral point voltage with respect to the virtual neutral point voltage (0 mV). The abscissa represents a relative position of the rotor with respect to a position (150 degrees) at which the rotor is rocked by a constant current flowing from the motor terminal U to the motor terminal V. Such a relative position of the rotor is simply referred to as "rotor position". The same reference of the abscissa applies to later-described FIGS. 6, 7, 8, 11, 14, 15, 16, 18, 21 and 22. The rotor position search pulse is applied by the two-phase conduction. In the case of a waveform A in FIG. 5A, with the U-phase taken as a source phase and the V-phase as a sink phase, the rotor position search pulse is applied for extremely short period of time or in very small amount so that the rotor remains still. Further, in the case of a waveform B in FIG. 5A, with the V-phase taken as the source phase and the U-phase as the sink phase, the rotor position search pulse is applied for an extremely short period of time or in very small amount so that the rotor remains still.

Here, the source phase is a phase which allows the motor current to flow from the inverter circuit 30 to the motor coil, and the sink phase is a phase which allows the motor current to flow from the motor coil into the inverter circuit 30. Further, a source current is the motor current in the source phase, and a sink current is the motor current in the sink phase.

In FIG. 5A, the waveform A and the waveform B represent neutral point difference voltages. It is to be noted that allowing the current pulse to flow with the U-phase taken as the source phase and the V-phase taken as the sink phase, as shown by the waveform A in FIG. 5A, is expressed by "U ⇒ V". Further, allowing the current pulse to flow with the V-phase taken as the source phase and the U-phase taken as the sink phase, as shown by the waveform B in FIG. 5A, is expressed by "V ⇒ U". Similarly, allowing a current pulse to flow from the source phase to the sink phase is expressed by "(source phase)⇒(sink phase)". Here, each of the (source phase) and the (sink phase) is any one of U, V and W. "(source phase)⇒(sink phase)" represents that the conduction phases in allowing the current pulse to flow are the (source phase) and the (sink phase), and the current pulse flows in a direction from the (source phase) to the (sink phase). Here, the rotor position search pulse is also referred to as a "direction in which the current pulse is allowed to flow", and expressed by "(source phase)⇒(sink phase)".

In FIG. 5A, the waveform A shows a result of measurement of a response signal of neutral point difference voltage as difference voltage between the actual neutral point CN1 and the virtual neutral point CN2 when the rotor position search pulse is applied in the forward direction from the U-phase coil to the V-phase coil. The waveform B shows a result of measurement of a response signal of neutral point difference voltage as difference voltage when the rotor position search pulse is applied in the backward direction from the V-phase coil to the U-phase coil.

FIG. 5B is a view showing a result (A+B) of adding the forward direction characteristic (A) and the backward direction characteristic (B) of the neutral point difference voltage in application of the rotor position search pulse between the U-phase coil and the V-phase coil shown in FIG. 5A. Such addition and synthesis of the forward direction characteristic (A) and the backward direction characteristic (B) of the neutral point difference voltage is performed by the synthesizer 53.

It is to be noted that the ordinate of FIG. 5 shows the neutral point difference voltage (mV). The electrical angle on the abscissa of FIG. 5 is shown with a position where the rotor is rocked by the constant current flowing from the U-phase terminal to the V-phase terminal, as 150 degrees. This applies to other similar drawings.

More specifically, the waveform A of FIG. 5A is drawn by plotting a neutral point difference voltage generated at the actual neutral point CN1 with reference to a voltage at the virtual neutral point CN2 when a high voltage (rotor position search pulse) is applied from the V-phase coil to the U-phase coil for such an extremely short period of time that the rotor is not reacted and remains still, in a relative position of the rotor to the stator.

Further, the waveform B of FIG. 5A is drawn by plotting a neutral point difference voltage generated at the actual neutral point CN1 with reference to a voltage at the virtual neutral point CN2 when a high voltage is applied from the U-phase coil to the V-phase coil for such an extremely short period of time that the rotor is not reacted and remains still, in a relative position of the rotor to the stator.

As for the waveform A of FIG. 5A, large peaks Bm and Pm are seen at about 110 and 190 degrees, respectively. The peak Bm at about 110 degrees is referred to as a "main bottom", and the peak Pm at about 190 degrees is referred to as a "main peak".

Similarly, as for the waveform B, large peaks Bm and Pm are seen at about 10 and 290 degrees, respectively. The peak Bm at about 10 degrees is referred to as a "main bottom", and the peak Pm at about 290 degrees is referred to as a "main peak". In addition, although not shown in the figure, a neutral point difference voltage generated when the current pulse is controlled to flow from the V-phase coil to the W-phase coil and a neutral point difference voltage generated when the current pulse is controlled to flow from the W-phase coil to the U-phase coil take a profile formed by shifting the plots of the solid line A of FIG. 5A by ±120 degrees. Further, a neutral point difference voltage generated when the current pulse is allowed to flow from the W-phase coil to the V-phase coil and a neutral point difference voltage generated when the current pulse is controlled to flow from the U-phase coil to the W-phase coil take a profile formed by shifting the plots of the solid line B of FIG. 5A by ±120 degrees.

As shown in FIG. 5A, for the rotor position the central positions (190 degrees, 290 degrees) of the main peaks Pm and the central positions (10 degrees, 110 degrees) of the main bottom Bm, which are obtained by the two-phase conduction, are slightly displaced from desired values. Here, the desired values are rotor positions at every electrical angle of 60 degrees such as 60, 120, 180, 240, 330, or 360(0) degrees. On the other hand, in FIG. 5B, the central position of the added main bottom Bm and the central position of the added main peak Pm are respectively 60 and 240 degrees, which are found to be almost equal to the desired values. The horizontal broken line in FIG. 5B shows a predetermined threshold (zero in this case) for determining a polarity of the result of addition of neutral point difference voltages. Namely, it is recognized that the waveform A+B shows a positive value higher than the threshold (zero) for a period T between electrical angles of 150 and 330 degrees, and shows a negative value less than the threshold (zero) between electrical angles of 0 degree and 150 degrees and between electrical angles of 330 degrees and 360 degrees (0 degree).

2-1-2 Relation Between Polarity of Neutral Point Difference Voltage and Torque Constant FIG. 6 shows the relation between torque constants and polarity determination outputs of voltages (hereinafter referred to as "added difference voltage") E1, E2, E3, which are obtained by adding a pair of neutral point difference voltages obtained in different conducting directions.

The waveforms of FIGS. 6A, 6B and 6C show outputs of the polarity determination unit 54 as shown in FIG. 5B. The polarity determination unit 54 determines a polarity of an added waveform obtained by bidirectional application of the rotor position search pulse between the two-phase coils, and then outputs the determination result. Here, "E1" is an added difference voltage obtained by adding respective response signals of neutral point difference voltages caused by application of the rotor position search pulse in the forward and backward directions between the U-phase coil and the V-phase coil. "E2" is an added difference voltage obtained by adding respective response signals of neutral point difference voltages caused by application of the rotor position search pulse in the forward and backward directions between the V-phase coil and the W-phase coil. "E3" is an added difference voltage obtained by adding respective response signals of neutral point difference voltages caused by application of the rotor position search pulse in the forward and backward directions between the W-phase coil and the U-phase coil. The results of the added difference voltages E1, E2, E3 are stored into the data storage units 55, 56, 57, respectively.

FIG. 6A shows a polarity determination output of the added difference voltage E1 with regard to conduction between the U-phase and the V-phase. In FIG. 6A, it is clear that the added difference voltage E1 shows a positive value between electrical angles of 150 and 330 degrees and shows a negative value between electrical angles of 0 and 150 degrees and between electrical angles of 330 degree and 360 degrees (0 degree).

Similarly, FIG. 6B shows a polarity determination output of the added difference voltage E2 with regard to conduction between the V-phase and the W-phase. In FIG. 6B, it is clear that the added difference voltage E2 shows a positive value between electrical angles of 0 degree and 90 degrees and between electrical angles of 270 degree and 360 degrees (0 degree), and shows a negative value between electrical angles of 90 and 270 degrees.

FIG. 6C shows a polarity determination output of the added difference voltage E3 with regard to conduction between the W-phase and the U-phase. In FIG. 6C, it is clear that the added difference voltage E3 shows a positive value between electrical angles of 30 and 210 degrees, and shows a negative value between electrical angles of 0 degree and 30 degrees and between electrical angles of 210 degree and 360 degrees (0 degree).

It is to be noted that in FIG. 6, the electrical angle, at which the back electromotive voltage begins to occur in the forward direction from the U-phase coil with reference to the neutral point voltage of the motor coils, is arranged to be 0 degree.

In FIG. 6, Tu, Tv, Tw respectively represent torque constants of the U-phase motor coil, the V-phase motor coil and the W-phase motor coil. The torque constant represents a torque obtained with respect to the motor current flowing through the motor coil by the ratio. In a case where the torque constant of a certain phase is positive, when the source current is controlled to flow through the corresponding motor coil, the torque is generated in the forward rotational direction and the rotor is accelerated. In a case where the torque constant of a certain phase is negative, when the sink current is allowed to flow through the corresponding motor coil, the torque is generated in the forward rotational direction and the rotor is accelerated.

For example, in FIG. 6, the V-phase torque constant Tv is positive and the W-phase torque constant Tw is negative during a period when the polarity of E1 is positive, the polarity of E2 is negative and the polarity of E3 is positive. Thus, the torque is generated in the forward rotational direction, by applying, in the direction of V⇒W, the current pulse having such an amplitude or for such a period of time that the rotor starts to move. Similarly, the U-phase torque constant Tu is positive and the W-phase torque constant Tw is negative during a period when the polarity of E1 is negative, the polarity of E2 is negative and the polarity of E3 is positive. Thus, the torque is generated in the forward rotational direction by applying, in the direction of U⇒W, the current pulse having such an amplitude or for such a period of time that the rotor starts to move.

Similarly, in FIG. 6, when applying the current pulse, having such an amplitude or for such a period of time that the rotor starts to move, in the direction of W⇒U during a period when the polarity of E1 is positive, the polarity of E2 is positive and the polarity of E3 is negative, or in the direction of W⇒V during a period when the polarity of E1 is negative, the polarity of E2 is positive and the polarity of E3 is negative, the torque is generated in the forward rotational direction. Here, the conduction phases in the forward rotational direction of which torque is generated during the stoppage of the rotor are referred to as "start conduction phases of the rotation start pulse"), and expressed by "(source phase)⇒ (sink phase)".

In FIG. 6, the position where the rotor is rocked is set to 150 degrees when the constant current is controlled to flow from the U-phase motor coil to the V-phase motor coil, as the reference of the abscissa, as in the case of FIG. 5. In the case of FIG. 6, this 150-degree position is a rotor position where the U-phase torque constant Tu and the V-phase torque constant Tv are both positive and have a consistent magnitude. Namely, this position is a point at which the U-phase torque constant Tu and the V-phase torque constant Tv intersect in the positive region. With the rotor located at this position, even when the source current is controlled to flow through the U-phase and the sink current is controlled to flow through the V-phase, the rotor remains still and is rocked since the magnitudes of the source current and the sink current agree with each other. As thus described, the foregoing reference of the abscissa correspond to the waveforms of the torque constants Tu, Tv, Tw in FIG. 6. In this figure, the U-phase torque constant Tu begins to be generated in the forward direction with the rotor position located at 0 degree. In this case, the back electromotive voltage of the U-phase motor coil also begins to be generated in the forward direction with reference to the neutral point voltage, at the rotor position 0 degree.

In FIG. 6, Tu, Tv and Tw represent torque constants of the U-phase coil, the V-phase coil and the W-phase coil.

In a case where the torque constants are positive values, when the current is controlled to flow from the terminal of the motor coil to the actual neutral point CN1, the torque is generated in the forward rotational direction, to accelerate the rotor. In a case where the torque constants are negative values, when the current is controlled to flow from the actual neutral point CN1 to the terminal of the motor coil, the torque is generated in the backward rotational direction, to accelerate the rotor.

For example, in FIG. 6, Tw is a positive value and Tv is a negative value in a range where the polarity of E1 is negative, the polarity of E2 is positive and the polarity of E3 is negative. Therefore, the torque is generated in the forward rotational direction by controlling the current to flow for such a period that the rotor can be reacted from the W-phase coil toward the V-phase coil.

Similarly, since Tu is a positive value and Tv is a negative value in a range where the polarity of E1 is negative, the polarity of E2 is positive and the polarity of E3 is positive. Therefore, the torque is generated in the forward rotational direction by controlling the current to flow for such a period that the rotor can be reacted from the U-phase coil toward the V-phase coil.

Similarly, since Tu is a positive value and Tw is a negative value in a range where the polarity of E1 is negative, the polarity of E2 is negative and the polarity of E3 is positive. Therefore, the torque is generated in the forward rotational direction by controlling the current to flow for such a period that the rotor can be reacted from the U-phase coil toward the W-phase coil.

Similarly, since Tv is a positive value and Tw is a negative value in a range where the polarity of E1 is positive, the polarity of E2 is negative and the polarity of E3 is positive. Therefore, the torque is generated in the forward rotational direction by controlling the current to flow for such a period that the rotor can be reacted from the V-phase coil toward the W-phase coil.

Similarly, since Tv is a positive value and Tu is a negative value in a range where the polarity of E1 is positive, the polarity of E2 is negative and the polarity of E3 is negative. Therefore, the torque is generated in the forward rotational direction by controlling the current to flow for such a period that the rotor can be reacted from the V-phase coil toward the U-phase coil.

Similarly, since Tw is a positive value and Tu is a negative value in a range where the polarity of E1 is positive, the polarity of E2 is positive and the polarity of E3 is negative. Therefore, the torque is generated in the forward rotational direction by controlling the current to flow for such a period that the rotor can be reacted from the W-phase coil toward the U-phase coil.

The conduction phases in the forward rotational direction of which the torque is generated during the stoppage of the rotor are hereinafter referred to as "start conduction phases of the rotation start pulse".

Figure 7:
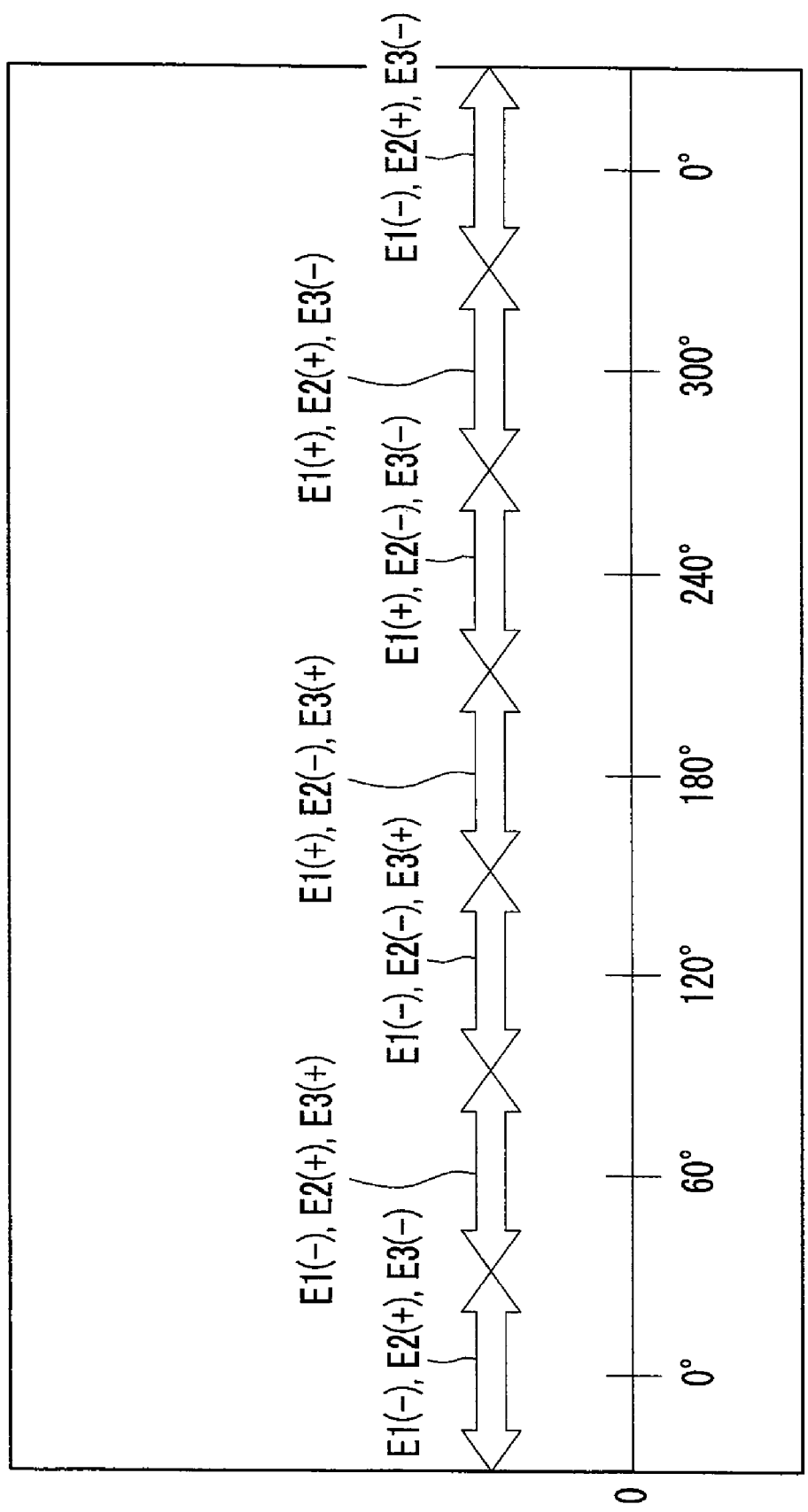
FIG. 7 is a view showing the relation between the rotor position detectable position and the combination of polarity outputs of results (E1, E2, E3) of adding neutral point difference voltages.

2-1-3 Relation Between Polarity of Neutral Point Difference Voltage and Rotor Detectable Position FIG. 7 is a view showing the relation between the combination of polarities of the added difference voltages E1, E2, E3 shown in FIG. 6 and to the rotor detectable position.

In other words, FIG. 7 shows rotor position detectable positions with outputs obtained by polarity determinations of results E1, E2 and E3 which are obtained by adding neutral point difference voltages generated by application of the rotor position searching pulses in the forward and backward directions in searching the rotor position by the two-phase conduction. FIG. 7 indicates that the torque can be generated in the forward rotational direction by controlling the current to flow in the following phase direction in each region.

TABLE 1

| Region | Conduction Direction |
| --- | --- |
| E1: negative, E2: positive, E3: negative | From W-phase to V-phase |
| E1: negative, E2: positive, E3: positive | From U-phase to V-phase |
| E1: negative, E2: negative, E3: positive | From U-phase to W-phase |
| E1: positive, E2: negative, E3: positive | From V-phase to W-phase |
| E1: positive, E2: negative, E3: negative | From V-phase to U-phase |
| E1: positive, E2: positive, E3: negative | From W-phase to U-phase |

In the above, "E1: negative" means that the polarity of E1 is negative, in which E1 is a result of adding response signals of respective neutral point difference voltages obtained by controlling the current of the rotor position search pulse to flow both in the forward and backward directions between the U-phase coil and the V-phase coil. "E2: positive" means that the polarity of E2 is positive, in which E2 is a result of adding response signals of respective neutral point difference voltages obtained by controlling the current of the rotor position search pulse to flow both in the forward and backward directions between the V-phase coil and the W-phase coil. "E3: negative" means that the polarity of E3 is negative, in which E3 is a result of adding response signals of respective neutral point difference voltages obtained by controlling the current of the rotor position search pulse to flow both in the forward and backward directions between the W-phase coil and the U-phase coil.

2-1-4 Detection and Polarity Determination of Neutral Point Difference Voltage

FIGS. 8A and 8B show the relation among the current pulse conducting direction (combination of conduction phases and conducting direction), the neutral point difference voltage by the neutral point difference voltage detector 40, the added difference voltage value E1, E2 and E3, and the start conduction phase of the rotation start pulse on the basis of output of the polarity determination of E1, E2 and E3, in the rotor position determination which is achieved by the rotor position search pulse in the two-phase conduction.

FIG. 8A is a view showing the relation among the conducting direction of the current pulse in the forward and backward directions, the neutral point difference voltage $\Delta Vc1$, $\Delta Vc2$ . . . , by the neutral point difference voltage detector 40, and the added difference voltage E1, E2 and E3 thereto, in the rotor position determination which is obtained by the rotor position search pulse in the two-phase conduction.

FIG. 8B is a view showing the relation among the polarity of E1, E2 and E3, the rotor position to be determined, and the start conduction phase of a rotation start pulse. In the present embodiment, as shown in FIG. 8B, the start conduction phases of the rotation start pulse (conduction phases for forwardly rotating the rotor) are switched in the order of U⇒V, U⇒W, V⇒W, V⇒U, W⇒U, W⇒V, U⇒V. The symbol "⇒" shows the direction in which a current is allowed to flow in the start conduction phases of the rotation start pulse. Further, the symbol "⇒" is also used at a point where the state transition of the polarity of E1, E2 or E3 is reversed every time the rotor position forwardly rotates an electrical angle of 60 degrees.

In the searching start mode, the commutation controller 22 selects two phases out of the three phases of the U-phase, the V-phase and the W-phase, and applies the rotor position search pulse between the two selected phases.

First, in <1> of FIG. 8A, a voltage signal of the virtual neutral point CN2 and a voltage signal of the actual neutral point CN1 are inputted into the neutral point difference voltage detector 40 in order that the rotor position search pulse is applied in the forward directions of the coils of the two selected phases (U-phase, V-phase) to measure a neutral point difference voltage generated when the current pulse is controlled to flow from the U-phase coil to the V-phase coil. These signals are inputted into the difference voltage detecting circuit (see FIG. 2), including a differential amplifier. Here, the difference voltage detecting circuit includes four resistors R1 and R2. When the voltage at the virtual neutral point CN2 to be inputted is A2, the voltage at the actual neutral point CN1 to be inputted is A1, and an offset voltage between the input buffer and the differential amplifier can be ignored, an output Vo of the difference voltage detecting circuit is expressed by the following expression.

$$Vo=(R2/R1)\times(A1-A2)+V_{offset}$$

When the ratio of resistance values between the resistor R1 and the resistor R2 is set to 1, ΔVc as a neutral point difference voltage signal is expressed by the following expression.

$$\Delta Vc=Vo-V_{offset}=A1-A2$$

The difference voltage detecting circuit outputs the voltage $V_{offset}$ and the voltage Vo to provide the difference voltage between the voltage at the virtual neutral point CN2 and the voltage at the actual neutral point CN1. The ADC and the voltage measurement circuit 44 uses a timing signal from the commutation controller 22 to appropriately sample the voltage $V_{offset}$ and the voltage Vo, and processes them to output ΔVc1 (=$V_{offset}$-Vo=A1-A2) as the neutral point difference voltage. The ADC and the voltage measurement circuit 44 then uses the timing signal from the commutation controller 22 to sample ΔVc1 as the neutral point difference voltage, and temporarily stores the sampling data in the sampling data storage unit 51.

Next, in order to measure the neutral point difference voltage obtained by application of the rotor position search pulse in the backward direction between the two selected phases, namely from the V-phase coil to the U-phase coil, the voltage signal of the virtual neutral point CN2 and the voltage signal of the actual neutral point CN1 are inputted into the neutral point difference voltage detector 40. In the same manner as described above, the ADC and the voltage measurement circuit 44 outputs ΔVc2 as the neutral point difference voltage. The ADC and the voltage measurement circuit 44 then uses the timing signal from the commutation controller 22 to sample ΔVc2 as the neutral point difference voltage, and temporarily stores the sampling data in a sampling data storage unit 52.

Next, using the timing signal from the commutation controller 22, ΔVc1 and ΔVc2 are added by the synthesizer 53. A polarity of the addition result E1 (ΔVc1+ΔVc2) is determined by the polarity determination unit 54, and using the timing signal from the commutation controller 22, the determination result is temporarily stored in an E1 data storage unit 55.

Next, in <2> of FIG. 8A, the voltage signal of the virtual neutral point CN2 and the voltage signal of the actual neutral point CN1 are inputted into the neutral point difference voltage detector 40 in order that the rotor position search pulse is applied in the forward direction of the coils of the two selected phases (V-phase, W-phase) to measure the neutral point difference voltage to be generated when the current pulse is controlled to flow from the V-phase coil to the W-phase coil.

In the neutral point difference voltage detector 40, the difference voltage detecting circuit outputs the voltage $V_{offset}$ and the voltage Vo to provide the difference voltage between the voltage at the virtual neutral point CN2 and the voltage at the actual neutral point CN1. The ADC and the voltage measurement circuit 44 uses the timing signal from the commutation controller 22 to appropriately sample the voltage $V_{offset}$ and the voltage Vo, and processes them to output ΔVc3 (=$V_{offset}$-Vo=A1-A2) as the neutral point difference voltage. The ADC and the voltage measurement circuit 44 then uses the timing signal from the commutation controller 22 to sample ΔVc3 as the neutral point difference voltage, and temporarily stores the sampling data in the sampling data storage unit 51.

Next, in the same manner as above, the current pulse is controlled to flow in the backward direction, namely from the W-phase coil to the V-phase coil, to measure a neutral point difference voltage ΔVc4, and the sampling data is stored in the sampling data storage unit 52.

The synthesizer 53 reads ΔVc3 and ΔVc4 which are stored in the sampling data storage units 51, 52, and then adds the read values. A polarity of the addition result E2 is determined by the polarity determination unit 54, and the determination result is stored into an E2 data storage unit 56.

Next, in <3> of FIG. 8A, the W-phase and the U-phase are selected, and subsequently, in the same manner as above, neutral point difference voltages ΔVc5 and ΔVc6 in application of the rotor position search pulse in the forward and backward directions are detected. Detected ΔVc5 and ΔVc6 are then stored into the sampling data storage units 51 and 52. Thereafter, the difference voltages ΔVc5 and ΔVc6 are added by the synthesizer 53, and a polarity of the addition result E3 is determined by the polarity determination unit 54, and the determination result is stored into an E3 data storage unit 57.

ΔVc1, ΔVc2, ΔVc3, ΔVc4, ΔVc5 and ΔVc6 as response signals of the neutral point difference voltages can be obtained only from the difference voltage between the signal A1 of the voltage at the actual neutral point CN1 of the motor coils and the signal A2 of the voltage at the virtual neutral point CN2. An amplitude of the difference voltage as the response signal of the neutral point difference voltage is level-shifted to a voltage with the voltage $V_{offset}$ of the difference voltage detecting circuit being set to the center, and then inputted into the ADC and the voltage measurement circuit 44. In this manner, the range of the input voltage into the ADC (AD converter) can be limited, and only the response signal of the neutral point difference voltage required for detection of the rotor position information can be extracted.

It is assumed that the neutral point difference voltage detector 40 has no level-shift function, and the range of the input voltage into the ADC is required to be one third to two thirds of the power supply voltage of the power supply section of the motor driving apparatus when the signal A1 of the voltage at the actual neutral point CN1 and the signal A2 of the voltage at the virtual neutral point CN2 are directly inputted into the ADC. In this case, the required range of the input voltage into the ADC is one third of the power supply voltage of the power supply section of the motor driving apparatus. However, in the present embodiment, since the neutral point difference voltage detector 40 has the level-shift function, the required range of the input voltage into the ADC is from 0 to the order of one eighth of the power supply voltage of the controller of the motor driving apparatus, and therefore the required range of the input voltage into the ADC is as small as in the order of one eighth of the power supply voltage of the controller (in this case, the power supply voltages of the power supply section and the controller of the motor driving apparatus are in the order of 5 V, and the amplitude of the signal of the neutral point difference voltage is in the order of 0.6 V.) Namely, provision of the difference voltage detector having the level-shift function to the neutral point difference voltage detector 40 allows the range of the input voltage into the ADC to be controlled independently of the power supply voltage which determines the amplitude of the drive voltage of the motor. This can reduce the accuracy and function of the ADC. Such a technique is especially suitable for applications requiring self-controllability of the motor, and for a low-cost motor driving system.

2-1-5 Determination of Start Conduction Phases of Rotation Start Pulse

A method for determining start conduction phases of the rotation start pulse is described by reference to FIG. 8B.

When polarity determination results with respect to E1, E2 and E3 are obtained in the manner as thus described, the rotor position determination unit 58 determines a current rotor position from information shown in the reference table of FIG. 8B, to determine conduction phases to which the rotation start pulse for providing the starting torque is to be applied next.

When the respective polarity determination results of E1, E2 and E3 are negative, negative and positive, the rotor position determination unit 58 determines conduction phases to which, and a conducting direction in which, the rotation start pulse is to be applied, so as to allow the current pulse for imparting the starting torque to flow from the U-phase coil to the W-phase coil as shown in <1> of FIG. 8B.

When the respective polarity determination results of E1, E2 and E3 are positive, negative and positive, the rotor position determination unit 58 determines start conduction phases of the rotation start pulse so as to allow the current pulse for imparting the starting torque to flow from the V-phase coil to the W-phase coil as shown in <2> of FIG. 8B.

When the respective polarity determination results of E1, E2 and E3 are positive, negative and negative, the rotor position determination unit 58 determines start conduction phases of the rotation start pulse so as to allow the current pulse for imparting the starting torque to flow from the V-phase coil to the U-phase coil as shown in <3> of FIG. 8B.

When the respective polarity determination results of E1, E2 and E3 are positive, positive and negative, the rotor position determination unit 58 determines start conduction phases of the rotation start pulse so as to allow the current pulse for imparting the starting torque to flow from the W-phase coil to the U-phase coil as shown in <4> of FIG. 8B.

When the respective polarity determination results of E1, E2 and E3 are negative, positive and negative, the rotor position determination unit 58 determines start conduction phases of the rotation start pulse so as to allow the current pulse for imparting the starting torque to flow from the W-phase coil to the V-phase coil as shown in <5> of FIG. 8B.

When the respective polarity determination results of E1, E2 and E3 are negative, positive and positive, the rotor position determination unit 58 determines start conduction phases of the rotation start pulse so as to allow the current pulse for imparting the starting torque to flow from the U-phase coil to the V-phase coil as shown in <6> of FIG. 8B.

As thus described, the polarity determination results temporarily stored in the data storage units 55, 56 and 57 are read out by the rotor position determination unit 58 based on the timing signal from the commutation controller 22, and the start conduction phases of the rotation start pulse are determined according to the information of the table of FIG. 8B. Information of determined conduction phases is inputted as a rotor position signal into the commutation controller 22, so that the start conduction phases of the rotation start pulse are set.

In the rotor position searching process of the searching start mode, the neutral point difference voltage detector 40 and the rotor position detecting circuit 50 operates in the above described manners.

Further, although the present embodiment is described using the timing signal from the commutation controller 22 as the timing signal for data sampling or data transfer, a timing signal generated by another timing signal generator may be used as the timing signal for data sampling or data transfer.

2-1-6 Simplification of Second and Subsequent Rotor Position Searching Processes In the searching start mode, the rotor position searching process and the rotation start torque applying process of applying the torque current to a suitable stator phase for providing the rotation start torque to the rotor of which position is already determined, are alternately repeated to accelerate the start. In the following, a process for reducing the motor starting time is described. Here, the process in the first rotor position searching process is made different from the process in the second or subsequent rotor position searching process.

In <1> of FIG. 8B, the respective polarities of the added difference voltages E1, E2, E3 are negative, negative and positive. In <2>, the respective polarities are positive, negative and positive. It is thus clear from <1> and <2> of FIG. 8B that, when the rotor position changes from 120 degrees to 180 degrees, only the polarity of E1 changes whereas the polarities of E2 and E3 are unchanged. It is clear from this fact that in the determination of the change in rotor position, constant determination of the changes in polarities of the three added difference voltages E1, E2 and E3 is not necessary, but only determination of the change in polarity of either one of the added difference voltages E1, E2 and E3 may be performed.

For example, when the respective polarity determination results of E1, E2 and E3 are negative, negative and positive and the rotor position is determined to be at 120 degrees in the first rotor position searching process, only the change in the polarity of E1 from negative to positive is detected in the second rotor position searching process. Similarly, the change in polarity of E3 may be determined for detecting the change in rotor position from 180 to 240 degrees, and the change in polarity of E2 may be determined for detecting the change in rotor position from 240 to 300 degrees.

Namely, in the second and subsequent rotor position searching processes, the rotor position search pulse current is applied in the forward and backward directions to a pair of conduction phases which are determined from the results E1, E2 and E3 of three times of polarity determination in the previous rotor position searching process, and the rotor position can be determined by detecting the change in polarity of those phases.

Thus, in the second and subsequent rotor position searching processes, since the rotor position can be detected by only one detection of change in polarity, operations associated with the polarity determination can be reduced, to shorten the motor start-up time.

It is to be noted that in the second and subsequent rotor position searches, all the added difference voltages E1, E2 and E3 may be subjected to the polarity determination.

2-1-7 Rotor Position Searching Process

In the following example, the rotor position search pulse current is controlled to flow from the U-phase coil to the V-phase coil in the first rotor position search.

(Rotor Position Search)

First, the commutation controller 22 selectively turns on a drive transistor 3 and a drive transistor 7 in FIG. 1 to allow the rotor position search pulse current to flow through a path which includes a high side power line 1, the drive transistor 3, the U-phase coil 10, the actual neutral point CN1 of the motor coils, the V-phase coil 11, the drive transistor 7, the current detection resistor 28 and a low side power line 2. Here, a response voltage of the neutral point difference voltage with respect to a potential of the virtual neutral point CN2, generated between the actual neutral point CN1 of the motor coils and the virtual neutral point CN2 of the resistor circuit 17, has a characteristic for the rotor position, as indicated by the solid line A of FIG. 5A. In the searching start mode, the neutral point difference voltage detector 40 detects the response voltage of the neutral point difference voltage, and inputs the detected response voltage into the ADC and the voltage measurement circuit 44 for calculation. The rotor position detecting circuit 50 stores the calculated result as sampling data $\Delta Vc1$ into a sampling data 1 storage unit.

Next, the commutation controller 22 turns on a drive transistor 4 and a drive transistor 6, to apply the rotor position search pulse to a path for the high side power line 1, the drive transistor 4, the V-phase coil 11, the actual neutral point CN1, the U-phase coil 10, the drive transistor 6, a current detecting resistor 18, and the low side power line 2. Namely, the rotor position search pulse is controlled to flow from the V-phase coil to the U-phase coil. At this time, the response voltage of the neutral point difference voltage with respect to a potential of the virtual neutral point CN2, generated between the actual neutral point CN1 and the virtual neutral point CN2 has a characteristic for the rotor position, as indicated by the broken line B of FIG. 5A. The neutral point difference voltage detector 40 detects the response voltage of the neutral point difference voltage, and inputs the detected response voltage into the ADC and the voltage measurement circuit 44 for calculation. The rotor position detecting circuit 50 stores the calculated result as sampling data $\Delta Vc2$ into a sampling data 2 storage unit.

Next, using the timing signal from the commutation controller 22, $\Delta Vc1$ and $\Delta Vc2$ are added by the synthesizer, and the polarity is determined from the addition result E1 by the polarity determination unit. The determination result is then temporarily stored into the E1 data storage unit using the timing signal from the commutation controller 22.

Further, the commutation controller 22 turns on the drive transistor 4 and a drive transistor 8, to allow the rotor position search pulse current to flow from the V-phase coil to the W-phase coil. In the searching start mode, the neutral point difference voltage detector detects the response voltage of the neutral point difference voltage, and inputs the detected response voltage into the ADC and the voltage measurement circuit 44 for calculation. In the rotor position polarity searching block, sampling data $\Delta Vc3$ is stored into the sampling data 1 storage unit.

Next, the commutation controller 22 turns on a drive transistor 5 and the drive transistor 7, to allow the rotor position search pulse current to flow from the W-phase coil to the V-phase coil. In the searching start mode, the neutral point difference voltage detector detects the response voltage of the neutral point difference voltage, and inputs the detected response voltage into the ADC and the voltage measurement circuit 44 for calculation. In the rotor position polarity searching block, sampling data $\Delta Vc4$ is stored into the sampling data 2 storage unit.

Next, using the timing signal from the commutation controller 22, $\Delta Vc3$ and $\Delta Vc4$ are added by the synthesizer, and the polarity is determined from the addition result by the polarity determination unit. The determination result is then temporarily stored into the E2 data storage unit using the timing signal from the commutation controller 22.

Further, the commutation controller 22 turns on the drive transistor 5 and the drive transistor 6, to allow the rotor position search pulse current to flow from the W-phase coil to the U-phase coil. In the searching start mode, the neutral point difference voltage detector detects the response voltage of the neutral point difference voltage, and inputs the detected response voltage into the ADC and the voltage measurement circuit 44 for calculation. In the rotor position polarity searching block, sampling data $\Delta Vc5$ is stored into the sampling data 1 storage unit.

Next, the commutation controller 22 turns on the drive transistor 3 and the drive transistor 8, to allow the rotor position search pulse current to flow from the U-phase coil to the W-phase coil. In the searching start mode, the neutral point difference voltage detector detects the response voltage of the neutral point difference voltage, and inputs the detected response voltage into the ADC and the voltage measurement circuit 44 for calculation. In the rotor position polarity searching block, sampling data $\Delta Vc6$ is stored into the sampling data 2 storage unit.

Next, using the timing signal from the commutation controller 22, $\Delta Vc5$ and $\Delta Vc6$ are added by the synthesizer, and the polarity is determined from the addition result by the polarity determination unit. The determination result is then temporarily stored into an E3 data storage unit by the use of the timing signal from the commutation controller 22.

(Applying Rotation Start Torque)

The rotation start torque is applied as follows. When the respective results of the polarity determination of E1, E2 and E3 are negative, negative and positive, as shown in <1> of FIG. 8B, the rotor position determination unit 58 determines the rotor position to be at an electrical angle of about 120 degrees (between 90 and 150 degrees), and turns on the drive transistor 3 and the drive transistor 8 so as to allow the current to flow from the U-phase coil to the W-phase coil. It is thereby possible to give a favorable rotation start torque. Further, when the respective results of the polarity determination of E1, E2 and E3 are positive, negative and positive, as shown in <2> of FIG. 8B, the rotor position determination unit 58 determines the rotor position to be an electrical angle of about 180 degrees (between 150 and 210 degrees), and turns on the drive transistor 4 and the drive transistor 8 so as to allow the current to flow from the V-phase coil to the W-phase coil.

As thus described, the respective polarity data of E1, E2 and E3, having been temporarily stored as polarity determination results into the E1/E2/E3 data storage units, are inputted into the rotor position determination unit 58 using the timing signal from the commutation controller 22. The rotor position determination unit 58 determines start conduction phases of the rotation start pulse according to the data of FIG. 8B, inputs the determined conduction phases into the commutation controller 22 as the signal of the rotor position, and processes the inputted signal, so that a favorable rotation start torque of the motor can be given.

2-1-8 Flowchart of Rotor Position Searching Process

Figure 9:
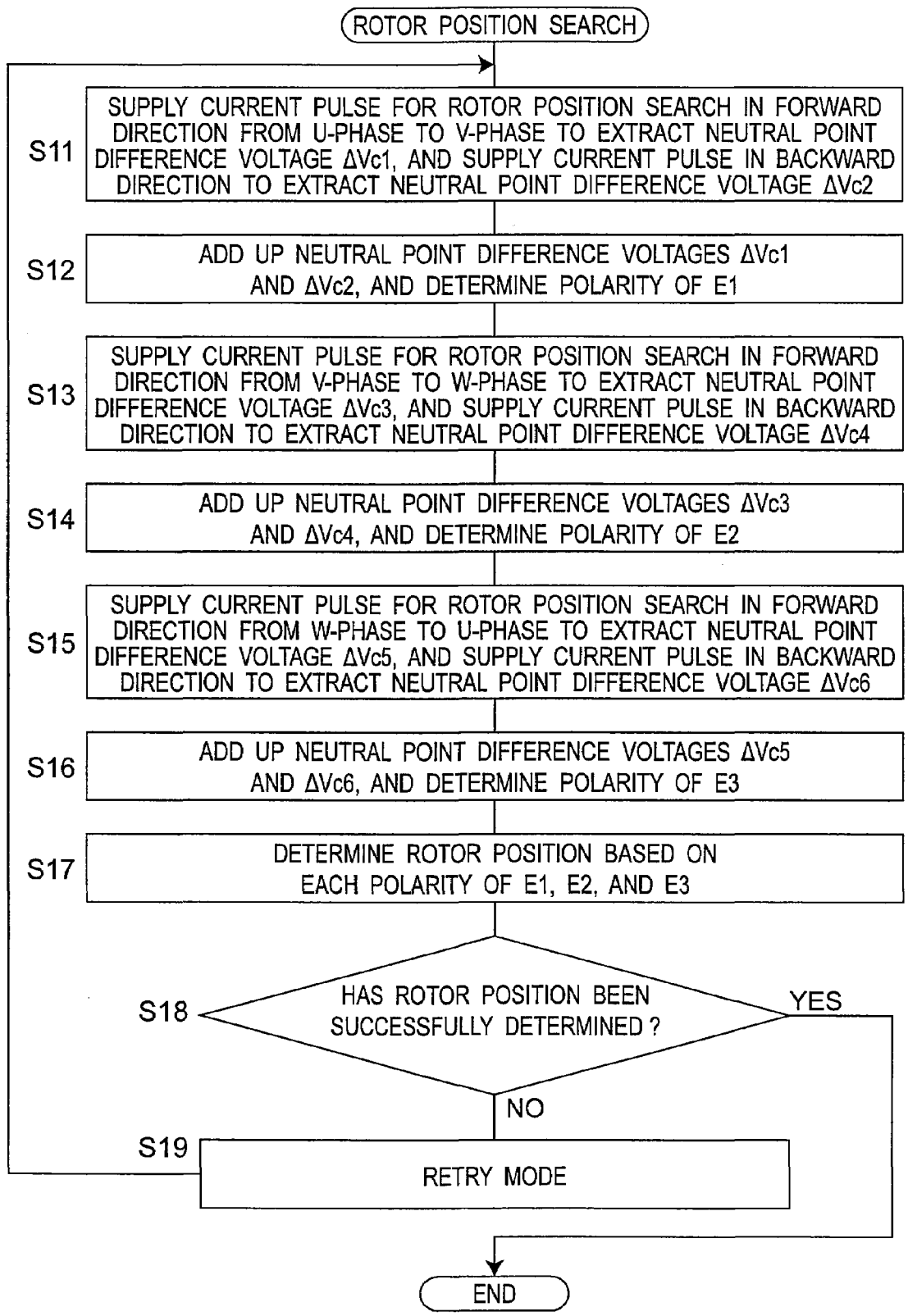
FIG. 9 is a flowchart of a rotor position searching process in a searching start mode.

The process in the rotor position searching process in the searching start mode is specifically described by reference to a flowchart of FIG. 9.

First, the neutral point difference voltages $\Delta Vc1$ and $\Delta Vc2$ are extracted (Step S11). Specifically, for the rotor position search, a setting for direction of the searching conduction with the current pulse is made to allow the rotor position searching current to flow from the U-phase coil to the V-phase coil which is the forward direction. The rotor position searching conduction is performed with the current pulse in the set direction. The neutral point difference voltage $\Delta Vc1$ is extracted as the response signal of the neutral point difference voltage to be inputted into the neutral point difference voltage detector.

After the extraction of $\Delta Vc1$, as an initial setting, the current flowing through the coils in the rotor position searching conduction is set to zero. The set direction of the rotor position searching conduction by the current pulse is switched. Next, for the rotor position search, a setting for direction of the searching conduction with the current pulse is made to allow the rotor position searching current to flow from the V-phase coil to the U-phase coil which is the backward direction. The rotor position searching conduction is then performed with the current pulse in the set direction. The neutral point difference voltage $\Delta Vc2$ is extracted as the response signal of the neutral point difference voltage to be inputted into the neutral point difference voltage detector.

After the extraction of $\Delta c2$, as the initial setting, the current flowing through the coils in the rotor position searching conduction is set to zero. The set direction of the rotor position searching conduction by the current pulse is switched.

The voltages $\Delta Vc1$ and $\Delta Vc2$ as the neutral point difference voltages extracted in Step S11 are added, and the polarity of the addition result E1 ($=\Delta Vc1+\Delta Vc2$) is determined (Step S12). The polarity of E1 is stored as the determination result.

Next, the neutral point difference voltages $\Delta Vc3$ and $\Delta Vc4$ are extracted (Step S13). For the rotor position search, a setting for direction of the searching conduction with the current pulse is made to allow the rotor position searching current to flow from the V-phase coil to the W-phase coil which is the forward direction. The rotor position searching conduction is then performed with the current pulse in the set direction. The neutral point difference voltage $\Delta Vc3$ is extracted as the response signal of the neutral point difference voltage to be inputted into the neutral point difference voltage detector.

After the extraction of $\Delta Vc3$, as the initial setting, the current flowing through the coils in the rotor position searching conduction is set to zero. The set direction of the rotor position searching conduction by the current pulse is switched. Next, for the rotor position search, a setting for direction of the searching conduction with the current pulse is made to allow the rotor position searching current to flow from the W-phase coil to the V-phase coil which is the backward direction. The rotor position searching conduction is then performed with the current pulse in the set direction. The neutral point difference voltage $\Delta Vc4$ is extracted as the response signal of the neutral point difference voltage to be inputted into the neutral point difference voltage detector.

After the extraction of $\Delta Vc4$, as the initial setting, the current flowing through the coils in the rotor position searching conduction is set to zero. The set direction of the rotor position searching conduction by the current pulse is switched.

The voltages $\Delta Vc3$ and $\Delta Vc4$ as the neutral point difference voltages extracted in Step S13 are added, and the polarity of the addition result E2 ($=\Delta Vc3+\Delta Vc4$) is determined (Step S14). The polarity of E2 is stored.

Next, the neutral point difference voltages $\Delta Vc5$ and $\Delta Vc6$ are extracted (Step S15). For the rotor position search, a setting for direction of the searching conduction with the current pulse is made to allow the rotor position searching current to flow from the W-phase coil to the U-phase coil which is the forward direction. The rotor position searching conduction is then performed with the current pulse in the set direction. The neutral point difference voltage $\Delta Vc5$ is extracted as the response signal of the neutral point difference voltage to be inputted into the neutral point difference voltage detector.

After the extraction of $\Delta Vc5$, as the initial setting, the current flowing through the coils in the rotor position searching conduction is set to zero. The set direction of the rotor position searching conduction by the current pulse is switched. Next, for the rotor position search, a setting for direction of the searching conduction with the current pulse is made to allow the rotor position searching current to flow from the U-phase coil to the W-phase coil which is the backward direction. The rotor position searching conduction is then performed with the current pulse in the set direction. The neutral point difference voltage $\Delta Vc6$ is extracted as the response signal of the neutral point difference voltage to be inputted into the neutral point difference voltage detector.

After the extraction of $\Delta Vc6$, as the initial setting, the current flowing through the coils in the rotor position searching conduction is set to zero. The voltages $\Delta Vc5$ and $\Delta Vc6$ as the neutral point difference voltages are added, and the polarity of the addition result E3 ($=\Delta Vc5+\Delta Vc6$) is determined (Step S16). The polarity of E3 is stored as the determination result.

On the basis of the results of polarity determination of E1, E2 and E3, the rotor position is determined by reference to the data shown in FIG. 8B (Step S17).

When the rotor position can be determined (YES in Step S18), the searching start mode is finished. When the rotor position can not be determined (NO in Step S18), the mode proceeds to a retry mode (Step S19). In the retry mode, a predetermined process is executed for shifting the rotor to a position where the rotor position can be determined.

In the retry mode, for example, a kick pulse is applied for slightly rotating the rotor, and thereby the relative position of the rotor with respect to the stator is shifted. In this case, number of times of attempting the retry mode is counted with a loop counter. When the count reaches a predetermined value, the mode may be shifted from the retry mode to another starting mode (e.g. synchronous starting mode). Alternatively, in the retry mode, a predetermined setting parameters with regard to each circuit constituting the motor driving apparatus may be changed (e.g. a $V_{offset}$ voltage value of the neutral point difference voltage detector may be switched), and then the rotor position detection may be repeated with the changed parameters. In this case, as for a setting parameter with the limited number of changes, the number of change may be counted so as not to exceed the limitation.

It is to be noted that in the above flowchart, the direction of the current pulse at the start of the rotor position searching conduction is set to the direction from the U-phase coil to the V-phase coil. However the direction is not limited to this, and conduction may be started in another pattern of phases.

Further, as described above, in the second and subsequent rotor position searching processes, the search pulse is preferably applied to either one pair of conduction phases of the U-phase/V-phase, the V-phase/W-phase, and the W-phase/U-phase. Then, only one of E1, E2 and E3 is subjected to the polarity determination. Namely, the start conduction phases of the rotation start pulse corresponding to the rotor position determined in the previous rotor position searching process are determined by reference to the information of FIG. 8B, and the current is then passed in the forward and backward directions for the determined conduction phases. After the conduction, only one of the added difference voltages E1, E2 and E3 is subjected to the polarity determination. The added difference voltage to be subjected to the polarity determination is determined on the basis of the information of FIG. 8B. As a result of the determination, when polarity inversion is detected, the rotor is determined to have been shifted to a next position, and the start conduction phases of the rotor position search pulse corresponding to the determined next position are determined by reference to the data of FIG. 8B. The current is then passed in the forward and backward directions for the determined conduction phases. Subsequently, this operation is repeated.

2-1-9 Flowchart of Rotation Start Torque Applying Process

Figure 10:
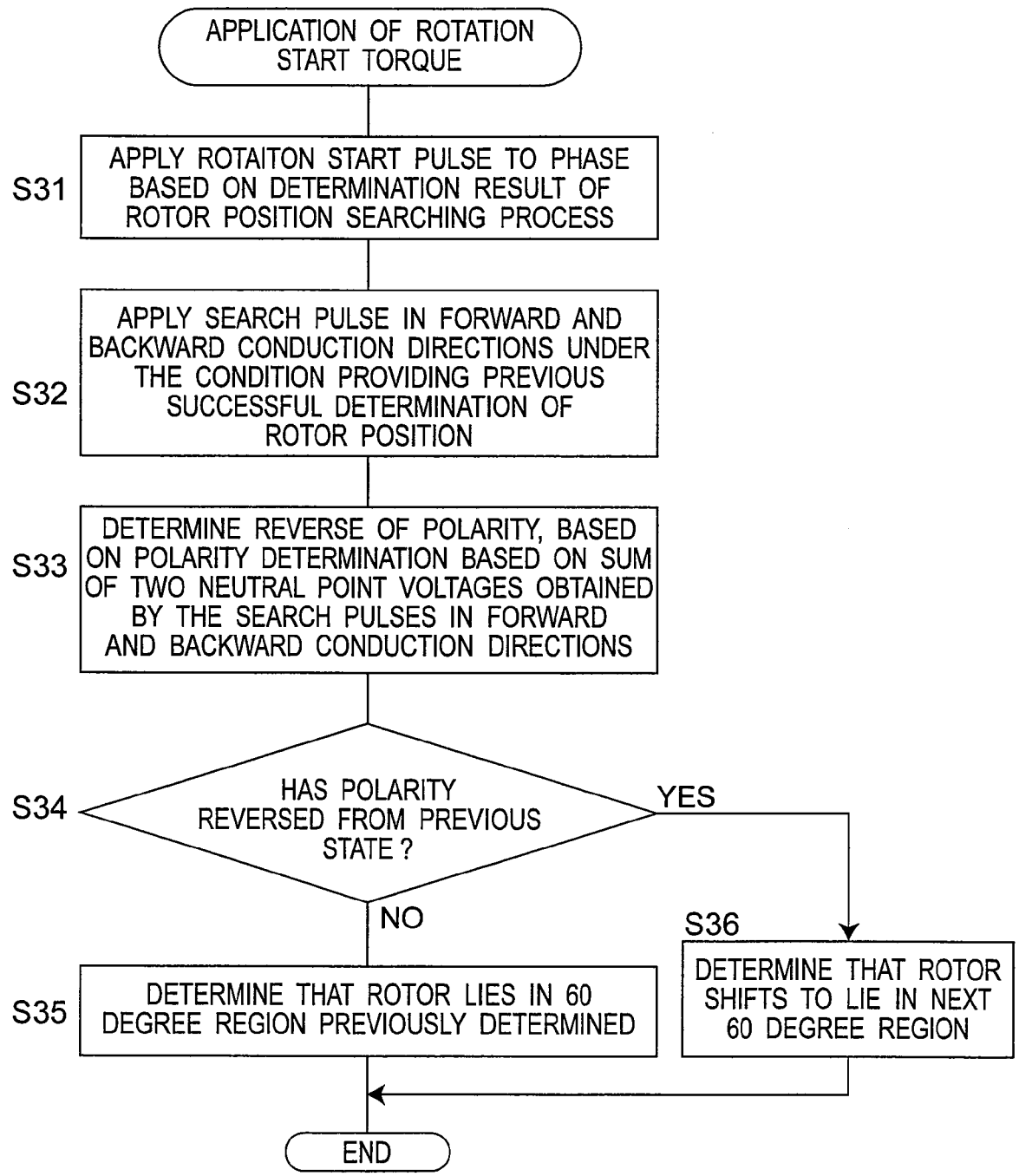
FIG. 10 is a flowchart of a rotation start torque applying process in the searching start mode.

Processes in the rotation start torque applying process in the searching start mode is specifically described by reference to a flowchart of FIG. 10.

In the rotation start torque applying process, the rotation start pulse is applied to the phases determined on the basis of determination result in the previous rotor position searching process (S31), thereby to move the rotor. Under conditions providing the successful previous determination, the search pulse is applied in the forward and backward directions (S32). The neutral point difference voltages in the forward and backward directions are detected, and the detected voltage values are added. The polarity of the added value is then determined (S33).

When the polarity is not reversed from the previous state, the rotor is determined to be located in the previously determined 60-degree zone (S35). When the polarity is reversed from the previous state, the rotor is determined to be shifted into a next 60-degree zone (S36).

2-1-10 Rotor Position Search Pulse and Rotation Start Pulse Waveform

A method for applying the rotor position search pulse and the rotation start pulse is specifically described with reference to FIG. 11.

FIG. 11 is a view explaining application of the rotor position search pulse and rotation start pulse. In FIG. 11 the abscissa axis is time axis. FIG. 11A, 11B and 11C respectively show a U-phase coil current, a V-phase coil current and a W-phase coil current. FIG. 11D shows polarity determination results of the added difference voltages E1, E2 and E3. FIG. 11E shows results of the rotor position determination.

FIG. 11 shows an example of the rotor position searching process, in which the rotor position search pulse is applied six times (namely, applied to the three pairs of the conduction phases) in the first rotor position searching process, and the rotation start pulse is applied to the conduction phases determined on the basis of the determination result in the previous rotor position searching process in the second and subsequent rotor position searching processes.

In FIG. 11, DS1 shows the rotor position search pulse process required in the first rotor position search. The rotor position search pulse is applied in the order of <1>, <2> and <3> as shown in FIG. 8A, and a pair of rotor position search pulses in the forward and backward directions is applied three times.

The first rotor position search pulse in the forward direction is applied from the U-phase coil to the V-phase coil by turning on the drive transistors 3 and 7 to extract sampling data $\Delta Vc1$, and the extracted data $\Delta Vc1$ is temporarily stored. Next, the rotor position search pulse in the backward direction is applied from the V-phase coil to the U-phase coil by turning on the drive transistors 4 and 6 to extract sampling data $\Delta Vc2$, and the extracted data $\Delta Vc2$ is temporarily stored.

The polarity of E1, which is a result of adding response signals of the neutral point difference voltages of the sampling data $\Delta Vc1$ and $\Delta Vc2$, is determined to be positive.

The second rotor position search pulse in the forward direction is applied from the V-phase coil to the W-phase coil by turning on the drive transistors 4 and 8 to extract sampling data $\Delta Vc3$, and the extracted data $\Delta Vc3$ is temporarily stored.

Next, the rotor position search pulse in the backward direction is applied from the W-phase coil to the V-phase coil by turning on the drive transistors 5 and 7 to extract sampling data $\Delta Vc4$, and the extracted data $\Delta Vc4$ is temporarily stored.

The polarity of E2, which is a result of adding response signals of the neutral point difference voltages of the sampling data $\Delta Vc3$ and $\Delta Vc4$, is determined to be negative.

The third rotor position search pulse in the forward direction is applied from the V-phase coil to the W-phase coil by turning on the drive transistors 5 and 6 to extract sampling data $\Delta Vc5$, and the extracted sampling data $\Delta Vc5$ is temporarily stored.

Next, the rotor position search pulse in the backward direction is applied from the U-phase coil to the W-phase coil by turning on the drive transistors 3 and 8 to extract sampling data $\Delta Vc6$, and the extracted data $\Delta Vc6$ is temporarily stored.

The polarity of E3, which is a result of adding response signals of the neutral point difference voltages of the sampling data $\Delta Vc5$ and $\Delta Vc6$, is determined to be negative.

Since the polarities of E1, E2 and E3 are respectively determined to be positive, negative and negative, the rotor position is determined to be at about 240 degrees. Conditions of the rotor position search pulse at this time are stored, and simultaneously the drive transistors 4 and 6 are turned on to apply the rotation start pulse from the V-phase coil to the U-phase coil in order to apply a suitable torque to the rotor in the rotation start pulse process SP1.

It can be recognized by reference to the previously stored search pulse conditions that the rotor position is at about 240 degrees. When the rotor position is at about 240 degrees, it is known from FIG. 8B that the current should then be passed from the V-phase to the U-phase. It is also known that the rotor position may be detected by detecting the reversal of only the polarity of E2.

Therefore, in the second rotor position search pulse process DS2, the rotor position search pulse in the forward direction is applied from the V-phase coil to the W-phase coil by turning on the drive transistors 4 and 8 to extract sampling data $\Delta Vc3$, and the extracted data $\Delta Vc3$ is temporarily stored.

Next, the rotor position search pulse in the backward direction is applied from the W-phase coil to the V-phase coil by turning on the drive transistors 5 and 7 to extract sampling data $\Delta Vc4$, and the extracted data $\Delta Vc4$ is temporarily stored.

It is determined whether or not the state transition of E2 which is a result of adding response signals of the neutral point difference voltages of the sampling data $\Delta Vc3$ and $\Delta Vc4$, is reversed.

In the example of FIG. 11, in DS2, the output of the polarity determination of E2 is negative, again. This is because the rotational speed is typically low at the start and hence the commutation occurrence frequency is sufficiently low compared with number of times of the rotor position searching. The search pulse conditions at this time are stored, and simultaneously the drive transistors 4 and 6 are turned on to provide the rotation start pulse from the V-phase coil to the U-phase coil in order to apply a suitable torque to the rotor in the rotation start pulse process SP2.

Subsequently, in the same manner as above, the rotor position search pulse processes DS3, DS4, DS5 and the rotation start pulse processes SP3 and SP4 are repeated until the rotor position variations are detected.

In the fifth rotor position search pulse process DS5, the polarity of E2 is obtained, and then the rotor position is determined to be at about 300 degrees. The search pulse conditions at this time are stored, and simultaneously the drive transistors 5 and 6 are turned on to provide the rotation start pulse from the W-phase coil to the U-phase coil in order to apply a suitable torque to the rotor in the starting rotation pulse process SP5.

Subsequently, in the same manner as above, the rotor position search pulse process and the rotation start pulse process are repeated. As thus described, from the first rotor position search pulse process DS1, the first 60-degree forward commutation is observed in the fifth rotor position search pulse process DS5, the second 60-degree forward commutation is observed in the eighth rotor position search pulse process DS8, and then the tenth 60-degree forward commutation is observed in the tenth rotor position search pulse process DS10. When the success in rotational start is determined with those three times of 60-degree forward commutation, the rotor position is then determined using a back electromotive voltage.

In a period AP1, with the drive transistors 3 and 7 turned on, the current is PWM-controlled so as to flow from the U-phase coil to the V-phase coil. Subsequently, the rotor position is detected with the back electromotive voltage to drive the motor (back electromotive voltage feedback mode).

In addition, although the success in start is determined by three times of completion of 60-degree forward commutation, the number of forward commutation for determining the success in start is not limited to three. The success in start may be determined on the basis that the rotational speed, obtained from zones of the 60 degree forward commutation, has reached a predetermined value.

Further, for application of accelerating torque immediately after the change from the searching start mode to the back electromotive voltage feedback mode, a zero-current period for forming a conduction profile and detecting a zero-cross of the back electromotive voltage is set at timing when the zero-cross of the back electromotive voltage occurs, which is previously expected from the commutation cycle per 60 degrees in the searching start mode.

For example, in FIG. 11, a zero-cross after the period AP1 is detected as the zero-cross of the back electromotive voltage. Upon determination of the rotor position in the 60-degree region, for example, the zero-cross from the positive to the negative of the back electromotive voltage of the W-phase coil which should occur at a central timing of the 60-degree region is detected. When the predetermined zero-cross has not occurred at the start of the zero-cross detection period, occurrence of the zero-cross is waited, and upon the occurrence, the 60-degree forward commutation is detected. In other words, in the case of waiting for occurrence of the zero-cross from the positive to the negative of the back electromotive voltage of the W-phase coil, when the back electromotive voltage of the W-phase coil is still positive at the start of the back electromotive voltage detection period, the zero-cross detection period is continued until a predetermined zero-cross occurs. Then the zero-cross is considered to occur at the point of occurrence of the predetermined zero-cross. In a case where it is determined that the predetermined zero-cross has been determined at the start of the back electromotive voltage detection period from the polarity of the back electromotive voltage, the timing of starting the back electromotive voltage of the W-phase coil is set to the timing of the zero-cross occurrence. Namely, when the back electromotive voltage of the W-phase coil has already become negative at the start of the detection period in detection of the zero-cross from the positive to the negative of the back electromotive voltage of the W-phase coil, it is immediately determined that the zero-cross have occurred. It is to be noted that detection of the zero-cross of the back electromotive voltage is later described by reference to FIG. 13.

2-2 Back Electromotive Voltage Feedback Mode

Next, the back electromotive voltage feedback mode is described. The back electromotive voltage feedback mode is a mode for controlling the commutation by stably detecting a back electromotive voltage generated by the rotation of the rotor.

2-2-1 Torque Control of Back Electromotive Voltage Feedback Mode

Torque control of the back electromotive voltage feedback mode is described. In this mode, the search command signal generator 25 and the start command signal generator 26 do not operate.

The phase torque command signal generator 24 receives a signal (external command signal) for instructing a toque from the outside, and generates a plurality of component torque command signals according to combinations between the timing from the commutation controller 22 and on-states of the switching elements 3 to 8.

The pulse generator 20 outputs a signal (PWM on-pulse) for providing an on-timing of a PWM signal in the phase selected in the commutation controller 22. The comparator 23 receives information of the phase in the on-state from the commutation controller 22, selects one component torque command signal to be compared with an output of the current detection amplifier 27, and compares the selected component torque command signal with the output of the current detection amplifier 27. Further, the comparator 23 compares the output of the current detection amplifier with each of the plurality of component torque command signals, and selects one of the comparison results. When the output of the current detection amplifier 27 becomes larger than the component torque command signal to be compared, the comparator 23 outputs a signal (PWM off-pulse) for providing an off-timing of the PWM signal. The PWM controller 21 inputs the on-pulse of the PWM signal and the PWM off pulse from the pulse generator 20 to control a pulse width of the phase selected by the commutation controller 22.

The above method enables current control even when the current is applied through all the three phase coils (e.g. see JP-A-2003-174789). It should be noted that in the case of performing 120-degree conduction, the phase torque command signal generator 24 is not required.

2-2-2 Conduction Control of Back Electromotive Voltage Feedback Mode

Next, conduction phase control of the back electromotive voltage feedback mode is described. In the back electromotive voltage feedback mode, the commutation controller 22 performs conduction control so as to make the current of each coil zero during a period when the polarity of each back electromotive voltage of each coil is expected to change.

In the coil where the current is zero, a time change element of the current also becomes zero after a short period of time, and a back electromotive voltage due to interaction of a magnetic flux of the rotating rotor and coils appears across each coil, that is, between a U-phase terminal line 13 and the actual neutral point CN1 of the motor coils, or between a V-phase terminal line 14 and the actual neutral point CN1, or between a W-phase terminal line 15 and the actual neutral point CN1. Therefore, timing (zero-cross timing) at which the polarity changes can be detected so as to accurately recognize the rotor position.

In the back electromotive voltage feedback mode, the threshold setting unit 38 sets a slight offset concerning the comparison between differential input signals of the back electromotive voltage detector 36. This offset can change the output of the comparator 34 according to whether or not the potential difference between differential input signals reaches a predetermined value. In other words, the offset functions as a threshold with respect to the differential input signal of the back electromotive voltage detector 36 to prevent an adverse effect by chattering of the zero-cross time.

In the back electromotive voltage detector 36, a coil in which a current and its change with time are zero is selected by the selection circuit 32 on the basis of information from the commutation controller 22. The zero-cross timing of the voltage of the coil in which the current and its change with time are zero is fed back to the commutation controller 22 through the back electromotive voltage detector 36. Thereby, accurate control of the commutation timing is continuously kept. In addition, the offset, namely threshold, may not be set for the purpose of preventing the chattering. The chattering can also be prevented by setting the PWM controller 21 inside the commutation controller 22, and in this case, the threshold setting unit 38 is not required. Further, a back electromotive voltage detector having a comparator may be previously prepared for each of the phase coils, which eliminates the need for the selection circuit 32 of the terminal line.

2-2-3 Motor Current and Back Electromotive Voltage

FIG. 12A is a view showing a motor current waveform of each phase in the back electromotive voltage feedback mode. FIG. 12B is a view showing edge directions of the zero-cross detection when the back electromotive voltage is detected which occurs in the non-conduction phase for respective conducted states of the U-phase, the V-phase and the W-phase.

FIGS. 12A to 12C show phase current to be applied to conduction phases determined by the commutation controller 22 and the back electromotive voltage of each phase. In FIG. 12A, the solid line shows a U-phase current, and the broken line shows a U-phase back electromotive voltage. Similarly, In FIG. 12B, the solid line shows a V-phase current, and the broken line shows a V-phase back electromotive voltage. In FIG. 12C, the solid line shows a W-phase current, and the broken line shows a W-phase back electromotive voltage. Portions hatched with respect to the solid lines of FIGS. 12A, 12B and 12C are PWM-controlled. Further, Zones I, II, III, IV, V, VI shown in FIG. 12 correspond to an electrical angle of 60 degrees.

FIG. 12D is a table showing conducted states of the conduction phases in zones I, II, III, IV, V and VI, and edge directions of the zero-cross detection for detecting the back electromotive voltage occurring in the non-conduction phase selected with respect to the conducted states of the U-phase, the V-phase and the W-phase. With regard to the zero-cross point detection in FIG. 12D, in the zone I, the control is made such that the zero-cross point of the W-phase as the non-conduction phase determined by the commutation controller 22 is detected. Therefore, the selection circuit 32 selects a neutral point terminal line Al and the W-phase terminal line 15. The back electromotive voltage detector 36 including the comparator detects a zero-cross point at which the back electromotive voltage of the W-phase becomes smaller than the voltage at the neutral point of the motor coils. This is expressed by W↓ in FIG. 12D.

In the zone II, control is made such that the zero-cross point of the V-phase as the non-conduction phase determined by the commutation controller 22 is detected. Therefore, in the selection circuit 32, a neutral point terminal line A1 and a V-phase terminal line 14 are selected, and a zero-cross point is detected in the back electromotive voltage detector 36 including the comparator at which the back electromotive voltage of the V-phase becomes larger than the voltage at the neutral point of the motor coils. This is expressed by V↑ in FIG. 12D.

In the same manner as above, upon receiving the non-conduction phase which is determined by the commutation controller 22 in each zone of an electrical angle of 60 degrees, in the zone III, the zero-cross point U↓ is detected at which the U-phase back electromotive voltage becomes smaller than the voltage at the neutral point of the motor coils. In the zone IV, the zero-cross point W↑ is detected at which the W-phase back electromotive voltage becomes larger than the voltage at the neutral point of the motor coils. In the zone V, the zero-cross point V↓ is detected at which the V-phase back electromotive voltage becomes smaller than the voltage at the neutral point of the motor coils. In the zone VI, the zero-cross point U↑ is detected at which the U-phase back electromotive voltage becomes larger than the voltage at the neutral point of the motor coils.

From the above understood is the concept of the edge direction of the zero-cross detection in the case of detecting the back electromotive voltage that occurs in the non-conduction phase with respect to the conducted states of the U-phase, the V-phase and the W-phase in the back electromotive voltage feedback mode.

2-2-4 Timing for Detecting Zero-Cross of Back Electromotive Voltage

Figure 13A:
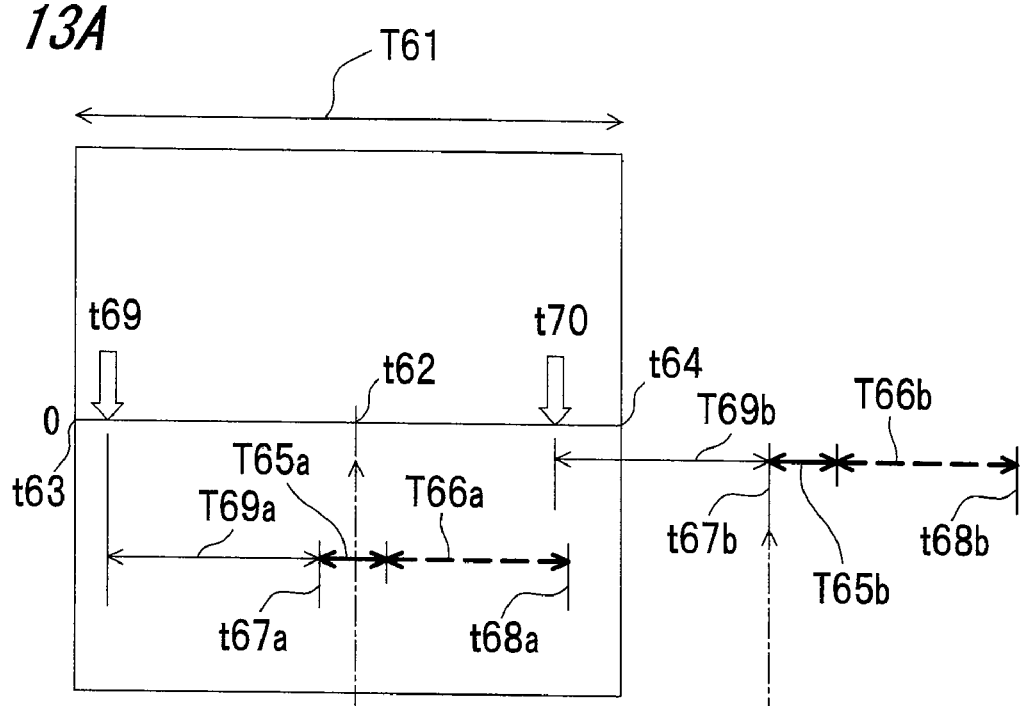
FIGS. 13A to 13C are views explaining timing for detecting zero-cross of the back electromotive voltage.
Figure 13B:
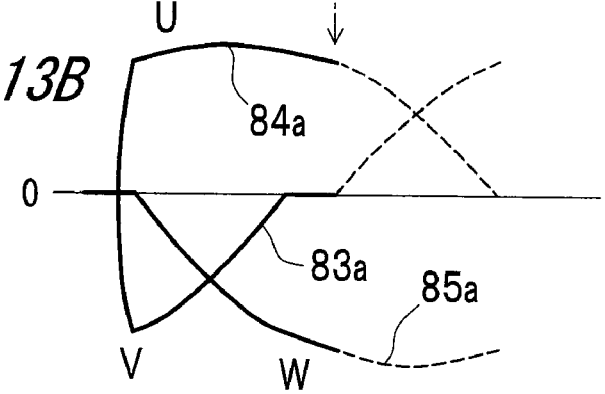
Figure 13C:
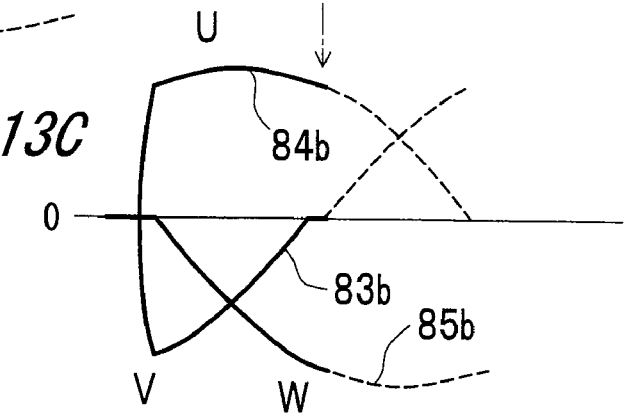

The zero-cross detection of the back electromotive voltage is specifically described with reference to FIGS. 13A to 13C. FIG. 13A is a view explaining timing for detecting zero-cross of the back electromotive voltage. FIGS. 13B and 13C show current profiles in cases where the rotor positions are at timing t69 and timing t70, respectively, immediately after the mode change form the searching start mode to the back electromotive voltage feedback mode. The abscissa shows a rotor position or a time axis.

In FIG. 13, symbol T61 denotes either one of the six kinds of 60-degree periods H1 to H6 shown in FIG. 12. Symbols t62, t63 and t64 respectively denote a central position, an initial position and a final position of the 60-degree period T61. Symbols T65a and T65b each denote a phase advance component in the back electromotive voltage zero-cross detection period. Symbols T66a and T66b each denote an extended zone of back electromotive voltage zero-cross detection period, which is extended until the back electromotive voltage zero-cross occurs. Symbols t67a and t67b each denote timing for starting the back electromotive voltage zero-cross detection period. Symbols t68a and t68b each denote timing for completing the back electromotive voltage zero-cross detection period.

In sensorless drive, it is necessary to prepare a zero current period for detecting the back electromotive voltage in each phase. A predetermined period within the zero current zone is referred to as a zero-cross detection period. The zero-cross detection period starts at the timing t67a or t67b, which is earlier by the predetermined period T65a or T65b than the next back electromotive voltage zero-cross timing expected by considering the previous 60-degree period T.

Thereby, when the expected cycle is long, namely the expected rotational speed is low, the phase is advanced little by little to gradually correct the expected value. Further, when the expected cycle is short, namely the expected rotational speed is high, as described above, occurrence of a predetermined back electromotive voltage zero-cross in a predetermined phase is continuously waited. This results in a delay of the phase, leading to detection of a right back electromotive voltage zero-cross at the timing t68a or t68b so as to correct the expected timing.

Typically, the number of rotor position search pulses is sufficiently large during the 60-degree forward commutation in the searching start mode immediately before the mode shift to the back electromotive voltage feedback mode. The rotor position immediately after the mode shift to the back electromotive voltage feedback mode is in the initial stage during the 60-degree periods, for example, at the timing t69.

The current profile of each phase current at this time is as shown in FIG. 13B. Upon receipt of information of the mode shift immediately before, a U-phase current 84a starts rising relatively steeply, and a V-phase current 83a starts falling relatively steeply, and a W-phase current 85a starts falling at a relatively gentle slope. Subsequently, the V-phase current 83a starts rising at a relatively gentle slope. The change ratios of the V-phase current 83a, the W-phase current 85a and the like are gentle here for the purpose of providing a slop current effective in reduction in vibration and noise of the motor. The V-phase current 83a then becomes zero. Immediately after a short-term zero current zone for stabilization of the V-phase current 83a to zero, a zero-cross detection period starts for detecting a zero-cross from the negative to the positive of the back electromotive voltage that appears in the V-phase. As a result of detecting the zero-cross at the timing t62, the V-phase current 83a starts rising at a relatively gentle slope further in the forward direction.

As thus described, with regard to the zero-cross of the back electromotive voltage that occurs after the mode shift to the back electromotive voltage feedback mode, it is possible to detect the back electromotive voltage zero-cross that occurs at the intermediate timing t62 of the 60-degree period. Therefore, the zero-cross detection period may be set in the vicinity of the timing t62, a 30-degree period after the timing 62. In this case, the zero-cross detection period is continued until the zero-cross is detected, thereby to accurately detect the zero-cross timing.

Further, when the number of rotation start pulses is small during the 60-degree period in the previous searching start mode and the rotor position immediately after the mode shift to the back electromotive voltage feedback mode is at the final portion of the 60-degree period, for example at timing t70, the current profile is as shown in FIG. 13C. Upon receipt of information of the previous rotor position, a U-phase current 84b starts rising relatively steeply, and a V-phase current 83b starts falling relatively steeply, and a W-phase current 85b starts falling at a relatively gentle slope. Subsequently, the V-phase current 83b starts rising at a relatively gentle slope. The change ratios of the V-phase current 83b and the W-phase current 85b are gentle here for the purpose of providing a slop current effective in reduction in vibration and noise of the motor. The V-phase current 83b then becomes zero. Immediately after a short-term zero current zone for stabilization of the V-phase current 83b to zero, a zero-cross detection period starts for detecting the zero-cross from the negative to the positive of the back electromotive voltage that appears in the V-phase. In this case, the back electromotive voltage zero-cross has already occurred at the timing t62, and it appears to be better to detect the zero-cross at the intermediate timing during a next 60-degree period.

However, in such a case, when the number of rotation start pulses during the 60-degree forward commutation of the searching start mode is sufficiently large, the zero-cross detection period continues for about 90-degrees, which causes a problem of reducing the torques. Therefore, even when the rotor position immediately after the mode shift to the back electromotive voltage feedback mode is at the timing t70, it is better to wait for the back electromotive voltage zero-cross in the 60-degree period. In this case, since the back electromotive voltage zero-cross has already occurred at the timing t62, the polarity is constant until a time period corresponding to 180 degrees elapses.

Therefore, it can be determined from the polarity that the back electromotive voltage zero-cross has already occurred at the timing t67b for starting the back electromotive voltage zero-cross detection. It is thus considered that the zero-cross is immediately detected, and a next 60-degree profile is then formed. This method further suppresses reduction in torque. As thus already described, the expected period information is reduced by the period shown by T65b, finally to allow detection of accurate zero-cross timing.

2-2-5 Measurement Result of Back Electromotive Voltage Immediately After Shift to Back Electromotive Voltage Feedback Mode In a three-phase brushless motor, a back electromotive voltage generated in the non-conduction phase immediately after the mode shift from the searching start mode to the back electromotive voltage feedback mode, was measured. FIGS. 14 and 15 show the measurement results.

Figure 14A:
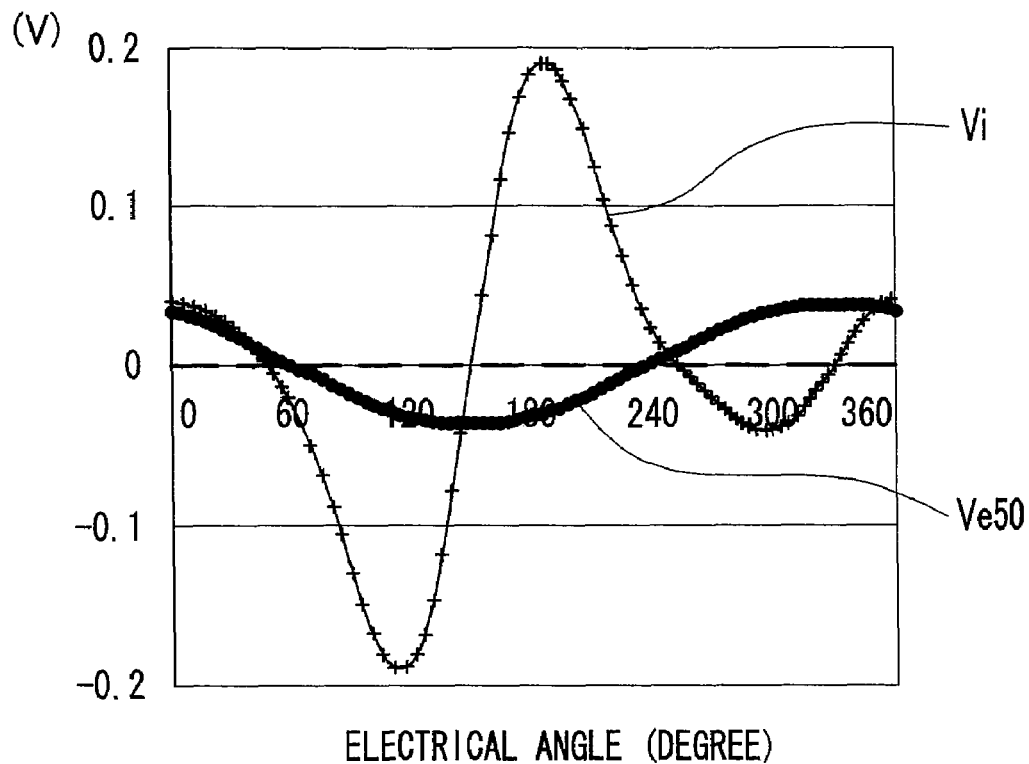
FIG. 14A is a view showing respective waveforms of an induced voltage and a back electromotive voltage generated in the W-phase as a non-conduction phase in conduction from U-phase coil to V-phase coil in a three-phase brushless motor at a motor rotating speed of 50 rpm.
Figure 14B:
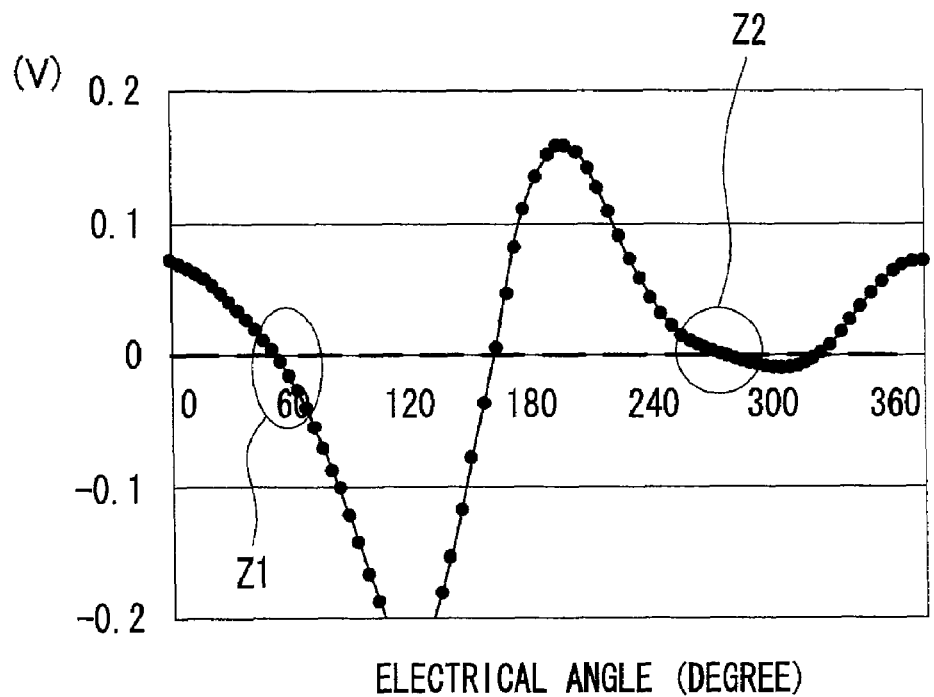
FIG. 14B is a view showing a waveform of a added voltage of the induced voltage and the back electromotive voltage generated in the non-conduction phase (W-phase).

FIG. 14A is a view showing a waveform (Vi) of an induced voltage of the W-phase and a waveform (Ve50) of a back electromotive voltage generated in the W-phase as the non-conduction phase when applying current from the U-phase coil to the V-phase coil when a three-phase brushless motor B rotates at a rotating speed of 50 rpm. It is to be noted that the abscissa indicates an electrical angle, and the ordinate indicates a voltage. The induced voltage and the back electromotive voltage generated in the W-phase are voltages with respect to a potential of the actual neutral point CN1. The power generation constant of the three-phase brushless motor is: Ke=0.74 mV/rpm (rpm: motor rotating speed per one minute). FIG. 14B is a view showing a waveform of an added voltage of the induced voltage (Vi) of the W-phase and the back electromotive voltage (Ve50) of the W-phase at the motor rotating speed of 50 rpm, which are shown in FIG. 14A.

Figure 15A:
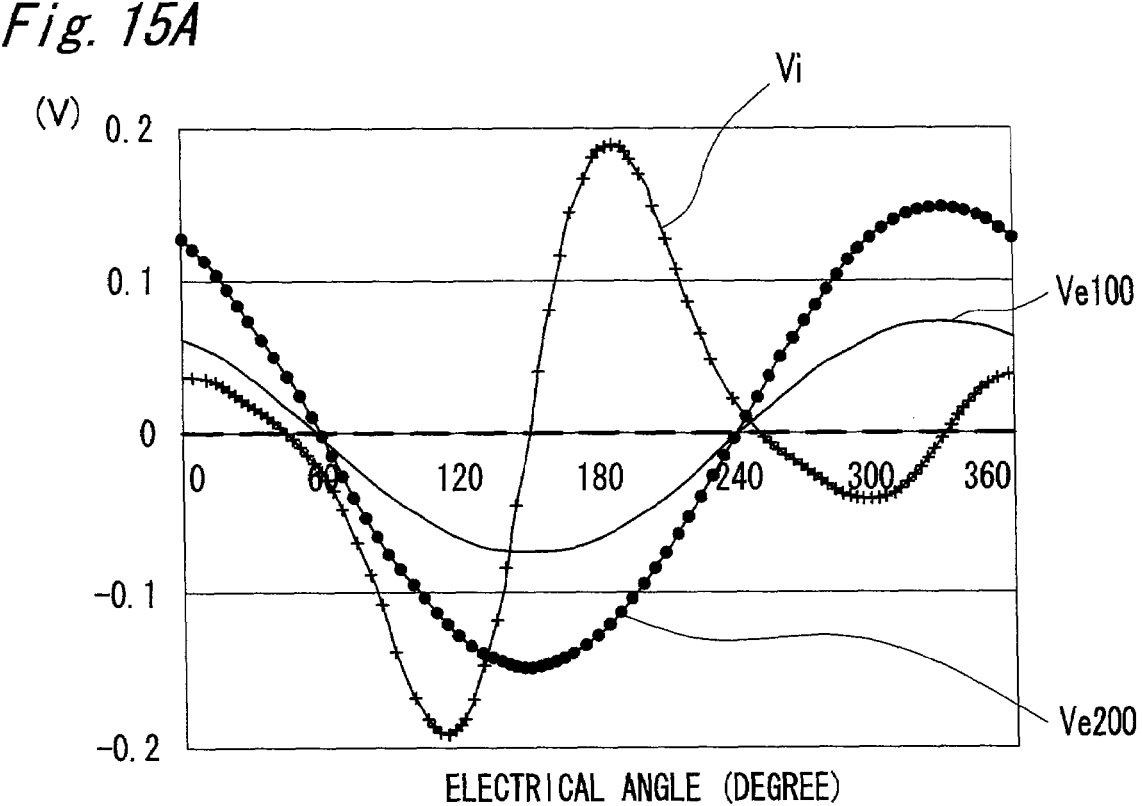
FIG. 15A is a view showing respective waveforms of the induced voltage and back electromotive voltages generated in the W-phase as the non-conduction phase in conduction from the U-phase coil to the V-phase coil in the three-phase blushless motor at rotor rotating speeds of 100 rpm and 200 rpm.
Figure 15B:
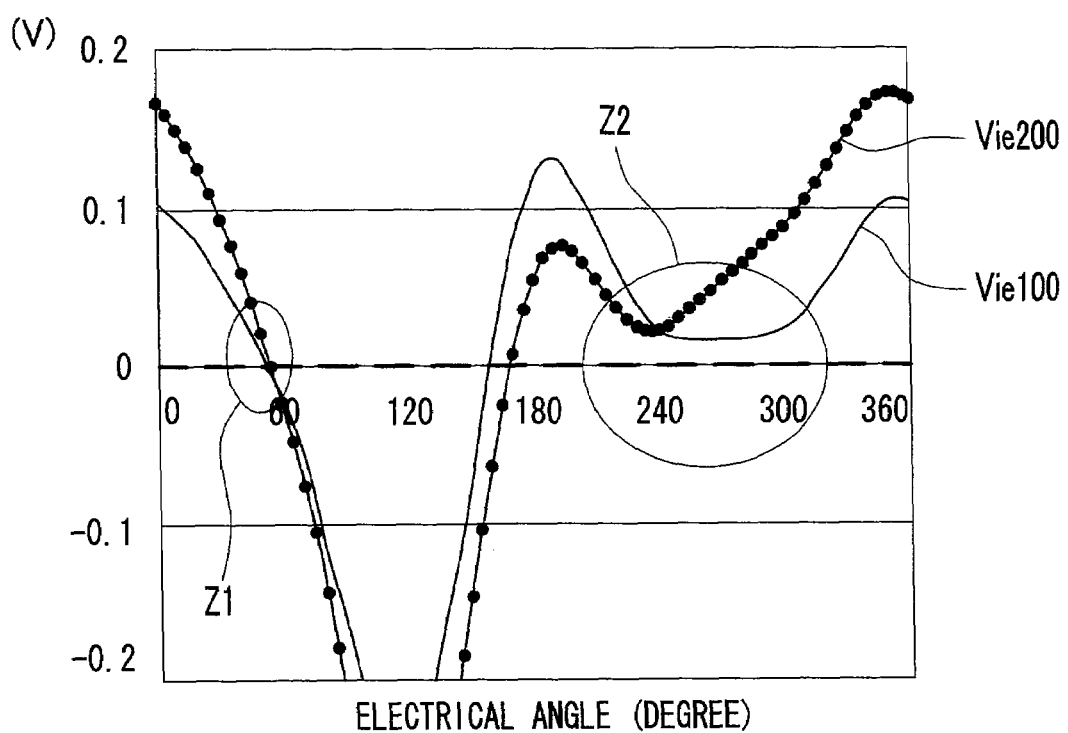
FIG. 15B is a view showing waveforms of added voltages of the induced voltage and the back electromotive voltages generated in the non-conduction phase (W-phase).

FIG. 15A is a view showing a waveform (Vi) of an induced voltage of the W-phase, a waveform (Ve100) of a back electromotive voltage generated in the W-phase as the non-conduction phase on applying current from the U-phase coil to the V-phase coil when the three-phase brushless motor rotates at a rotating speed of 100 rpm, and a waveform (Ve200) of a back electromotive voltage generated in the W-phase as the non-conduction phase when applying current from the U-phase coil to the V-phase coil at a motor rotating speed of 200 rpm. FIG. 15B is a view showing a waveform (Vie100) of an added voltage of the induced voltage of the w-phase and the back electromotive voltage of the W-phase at the motor rotating speed of 100 rpm, and a waveform (Vie200) of an added voltage of the induced voltage of the w-phase and the back electromotive voltage of the W-phase at the motor rotating speed of 200 rpm, which are shown in FIG. 15A.

Immediately after the mode shift from the searching start mode to the back electromotive voltage feedback mode, the added voltage of the back electromotive voltage and the induced voltage is generated in the W-phase as the non-conduction phase in detection of the back electromotive voltage by the two-phase conduction from the U-phase coil to the V-phase coil, as shown in FIGS. 14B and 15B. Further, as described in the explanation of FIGS. 15A and 15B, detecting the zero-cross of the W-phase voltage is to detect the falling edge of the added voltage of the W-phase in the back electromotive voltage feedback mode in conduction from the U-phase to the V-phase.

As shown in FIG. 14B, immediately after the mode shift from the searching start mode to the back electromotive voltage feedback mode, since the motor rotating speed is low, the back electromotive voltage generated in the W-phase is small and the current passing through the two phases is relatively large due to the motor start. Therefore, the induced voltage of the W-phase exerts a large effect.

For this reason, in FIG. 14B, the zero-cross of the W-phase induced voltage and the neutral point voltage of the motor coils occur at two points Z1 and Z2 of electrical angles of about 50 degrees and 270 degrees. The zero-cross at about 50 degrees which occurs in detection during the back electromotive voltage detection period, is detected at a normal position and thus has no problem. However, the zero-cross at about 270 degrees is detected at erroneous detection position and thus has the possibility to cause a problem of motor reversal or the like.

In order to avoid this problem, the motor rotating speed is kept high immediately after the mode shift from the searching start mode to the back electromotive voltage feedback mode. Thereby, the back electromotive voltage generated in the W-phase is high, allowing reduction in effect exerted by the induced voltage of the W-phase in the added voltage of the W-phase induced voltage and the waveform of the W-phase back electromotive voltage which are generated by the two-phase conduction.

This can be easily understood from FIG. 15B. In this figure, the zero-cross of the added voltage of the back electromotive voltage waveform (Ve100, Ve200) and the W-phase back electromotive voltage is generated only at the electrical angle of about 50 degrees (Z1). Namely, the zero-cross at the electrical angle of about 270 degrees (Z2) is avoided since the back electromotive voltage of the W-phase becomes larger due to the high motor rotating speed compared with the case of FIG. 14B. It is thereby possible to prevent erroneous detection of the zero-cross Z2 at about 270 degrees.

As thus described, it is found preferable that, when the mode is shifted from the searching start mode to the back electromotive voltage feedback mode, the motor be accelerated in the searching start mode until the motor rotating speed becomes a predetermined rotating speed, and then the mode be shifted to the back electromotive voltage feedback mode.

Incidentally, the back electromotive voltages respectively generated in the U-phase coil, the V-phase coil and the W-phase coil are in sinusoidal waveforms with a 120-degree phase difference. The neutral point voltage of the three-phase motor is an added voltage of the back electromotive voltages generated respectively in the U-phase coil, the V-phase coil and the W-phase coil. Namely, it is generally known that the neutral point voltage of the three-phase motor as the added voltage of the three sinusoidal waves with a 120-degree phase difference is ideally zero (excluding the case of a three-time higher harmonic component etc.) As thus described, the difference voltage of the voltage at the actual neutral point CN1 of the motor coils and the voltage at the virtual neutral point CN2 of the resistor circuit 17 only includes variation component of the neutral point difference voltage, which is independent of the effect of the back electromotive voltage. Hence the difference voltage is accurate rotor position information independently of the effect of the back electromotive voltage.

Namely, according to the embodiment of the present invention, in the searching start mode, the rotor position searching process for detecting a response signal of the neutral point difference voltage with the two-phase conduction and the rotation start torque applying process for providing appropriate starting acceleration to the motor before the mode shift to the back electromotive voltage feedback mode are alternately repeated. In the rotor position searching process with the two-phase conduction in the searching start mode, only the variation component of the neutral point difference voltage which is independent of the effect of the back electromotive voltage is detected in the response signal of the difference voltage between the voltage at the actual neutral point CN1 of the motor coils as the point for detecting the rotor position signal and the voltage at the virtual neutral point CN2 of the resistor circuit 17. Therefore, accurate rotor position information can be detected by starting acceleration in the searching start mode, making it possible to quickly and reliably realize desired starting acceleration.

Further, immediately after the mode shift from the searching start mode to the back electromotive voltage feedback mode, the added voltage of the induced voltage and the back electromotive voltage is generated in the non-conduction phase which is a target for back electromotive voltage detection. When the rotating speed is insufficient in initial acceleration of the start of the motor, the problem of reversal or the like, caused by the erroneous detection of the rotor position, might occur in a specific three-phase brushless motor as shown in FIGS. 14A and 14B. However, according to the present embodiment, the difference voltage between the actual neutral point CN1 and the voltage at the virtual neutral point CN2 is used for the detection signal of the motor position. Since this neutral point difference voltage signal includes only a variation component of the neutral point difference voltage independent of the effect of the back electromotive voltage, accurate rotor position information can be detected. Moreover, in the searching start mode, sufficient starting acceleration is provided to the motor until the motor rotational speed reaches or exceeds a predetermined value to increase an amount of an induced voltage component included in the detected neutral point difference voltage, thereby allowing prevention of erroneous detection of the rotor position immediately after the mode shift from the searching start mode to the back electromotive voltage feedback mode, so as to realize quick and reliable start.

2-2-6 Rotor Position Search with Three-Phase Conduction

Figure 16A:
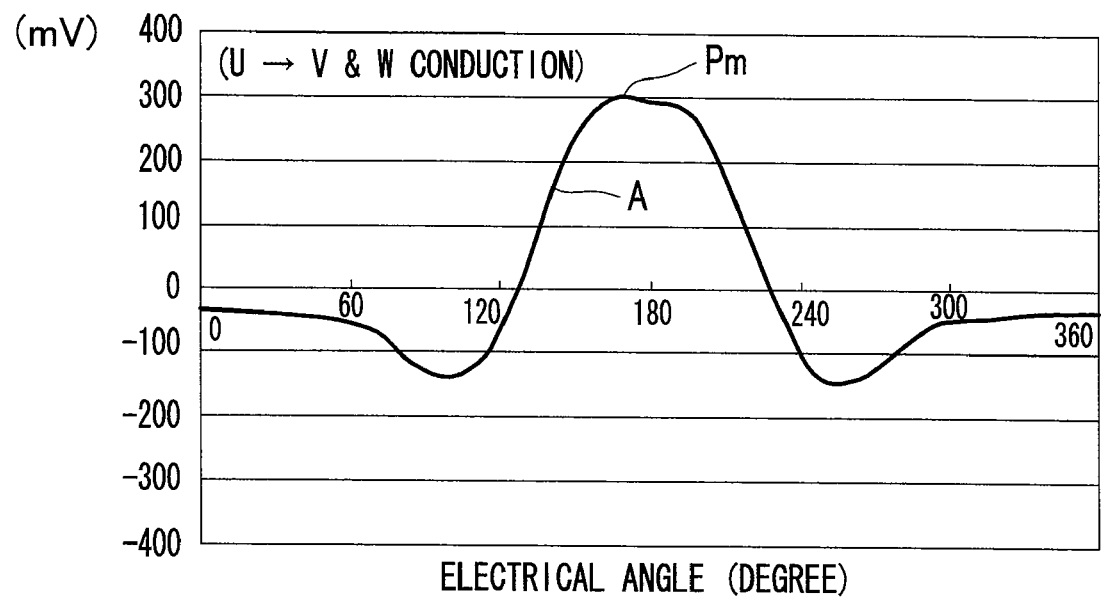
FIG. 16A is a characteristic view showing a result of measuring a response signal of a neutral point difference voltage in application of the rotor position search pulse from the U-phase coil to the V-phase coil and the W-phase coil.
Figure 16B:
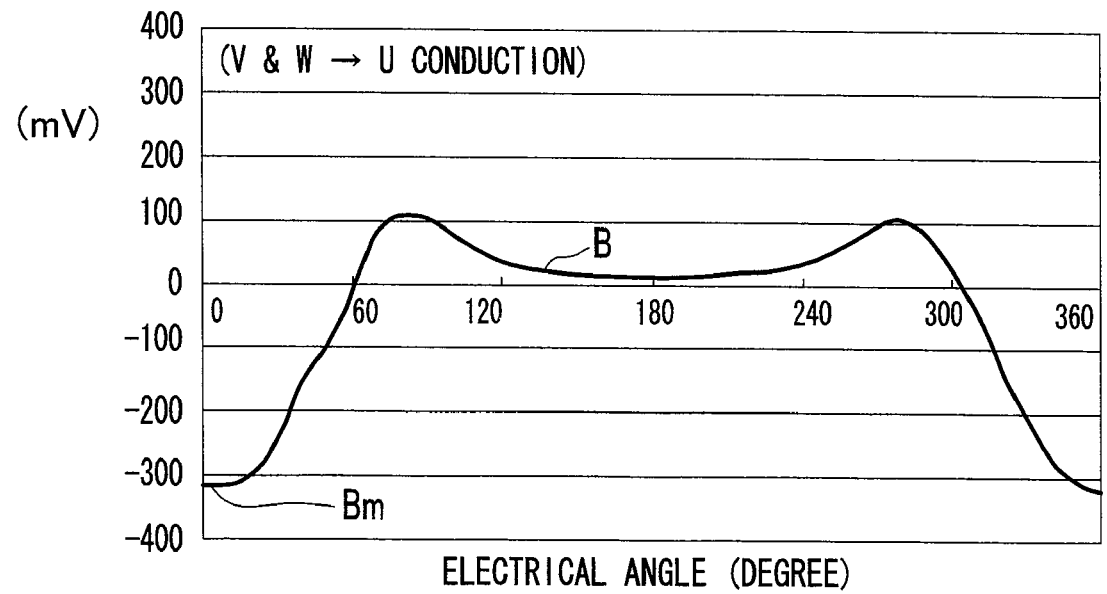
FIG. 16B is a characteristic view showing a result of measuring a response signal of a neutral point difference voltage in application of a rotor position search pulse from the V-phase coil and the W-phase coil to the U-phase coil.

FIG. 5 is a view showing a neutral point difference voltage generated by application of the rotor position search pulse with two-phase conduction (energizing) in the three-phase brushless motor. FIG. 16 is a view showing a neutral point difference voltage generated by application of the rotor position search pulse with three-phase conduction (energizing) in the three-phase brushless motor. FIG. 16A is a characteristic view showing a measurement result of a response voltage of the neutral point difference voltage as the difference voltage between the voltage at the actual neutral point CN1 and the voltage at the virtual neutral point CN2 in application of the rotor position search pulse from the U-phase coil to the V-phase and W-phase coils. FIG. 16B is a characteristic view showing a measurement result of a response voltage of the neutral point difference voltage from the V-phase and W-phase coils to the U-phase coil.

The difference between the rotor position search with the two-phase conduction shown in FIG. 5 and the rotor position search with the three-phase conduction shown in FIG. 16 is discussed below.

In FIG. 5A and FIGS. 16A and 16B, for determination of polarities of the main peak Pm and the main bottom Bm, a predetermined positive threshold is provided to the main peak Pm to determine positive polarity, and a predetermined negative threshold is provided to the main bottom Bm to determine negative polarity.

Regarding a region where the rotor position is detectable by the rotor position search pulse in the two-phase conduction, variations in neutral point difference voltage can be detected according to both polarities of the positive and negative with one rotor position search pulse. Hence an amount of information of the rotor position detectable region essentially included in the rotor position information is larger in the rotor position search with the two-phase conduction than that with three-phase conduction.

As thus described, at the start of the rotor position sensorless motor, the polarity is detected from the added neutral point difference voltage, followed by providing the starting torque in the searching start mode according to reference data on the basis of a predetermined number of polarity determination results, and performing starting acceleration, and then the mode can then be shifted to the back electromotive voltage feedback mode. Therefore, the amount of information of the rotor position detectable region increases, which can reduce the possibility of restart of the motor due to a dead point of the rotor position information. Further, displacement of the rotor position information can be corrected by the addition, thereby applying the optimum starting torque to achieve the starting acceleration. Accordingly, it is possible to quickly and reliably start the motor without sensors for rotor position.

Embodiment 2

In Embodiment 1, the method for setting start conduction phases of the rotation start pulse is described by reference to FIG. 8. In the present embodiment, another example thereof is described.

FIG. 17A shows another example. In the example of FIG. 17A, polarity determination of E1, E2 and E3 are processed in an arithmetic circuit. Specifically, the polarities of E1, E2 and E3 are binarized. The binarized polarity values of E1, E2 and E3 are weighted and summed, and on the basis of the summed values, the start conduction phases of the rotation start pulse are set.

In the example of FIG. 17A, when the polarity of E1, E2 or E3 is positive, the polarity value is 1, and when the polarity is negative, the polarity value is 0. The weights to the polarity values of E1, E2 and E3 are 1, 2 and 4, respectively. Summed values for polarity determination are 4, 5, 1, 3, 2, and 6. In polarity determination, at he polarity values of E1, E2 and E3 are summed. When the summed value becomes a value shown in FIG. 17A, according to the integrated value, the start conduction phases of the rotation start pulse are set to U⇒W, V⇒W, V⇒U, W⇒U, W⇒V, or U⇒V.

By reference to FIG. 17B, still another example of a method for setting conduction phases at the start of the rotation start pulse is described. In the example of FIG. 17B, when the polarity of E1, E2 or E3 are positive, the polarity values is 1, and when the polarity is negative, the polarity value is −1. The weights to the polarities of E1, E2 and E3, are 1, 2 and 4, respectively. Summed values for polarity determination are 1, 3, −5, −1, −3, and 5. In polarity determination, at he polarity values of E1, E2 and E3 are summed, and the summed value is then added with a predetermined value α (5 in the example). When the obtained value (summed value +α) becomes a value shown in FIG. 17B, according to the value of (summed value +α), the start conduction phases of the rotation start pulse are set to U⇒W, V⇒W, V⇒U, W⇒U, W⇒V, or U⇒V.

It is understood from what is described above that the setting of the start conduction phases of the rotation start pulse by determination of polarities of E1, E2 and E3 can be made by any of the processes in FIGS. 8B, 17A, and 17B. It is understood that setting of the start conduction phases of the rotation start pulse can be executed by processes in a logic circuit in FIG. 8B, and in the arithmetic circuit in FIGS. 17A, 17B.

It is to be noted that in setting the start conduction phases of the rotation start pulse, the circuit scale tends to be relatively small in the case of achieving the processes in the logic circuit compared with the arithmetic circuit. It is therefore thought that the setting by the processes in the logic circuit can be readily applied to the case of requiring the motor alone to have a self-controlling property or the case of using a low-cost motor drive system.

Embodiment 3

Figure 18:
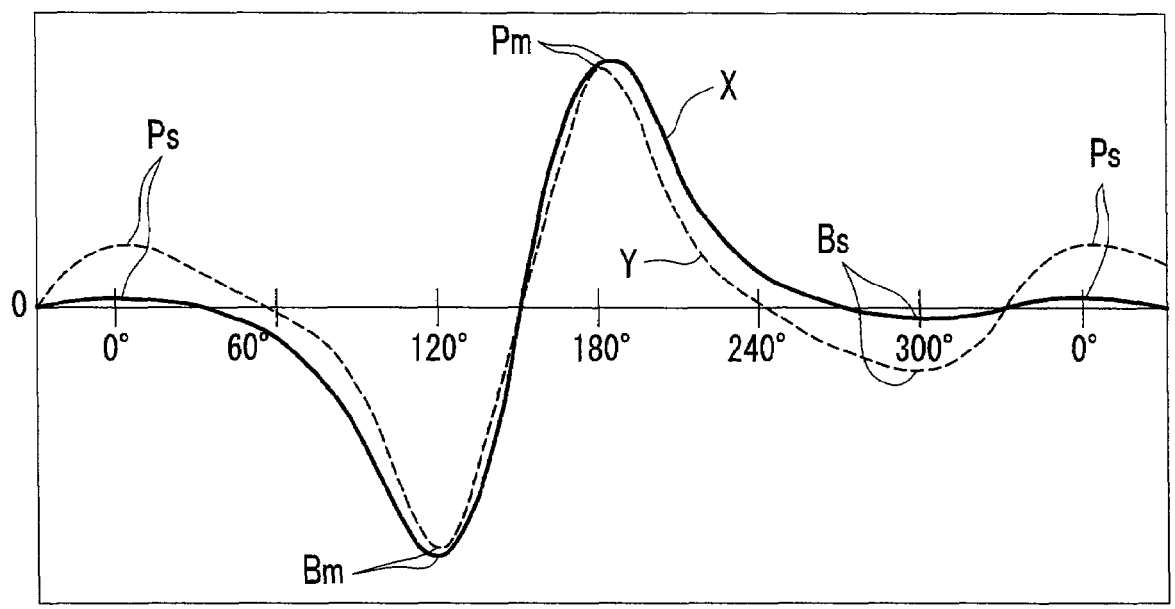
FIG. 18 is a view showing rotor position dependence characteristics of response signals of neutral point difference voltages in cases different in level of the rotor position search pulse in application of the rotor position search pulse from the U-phase coil to the V-shape coil.

A preferred mode of the rotor position search pulse is described. FIG. 18 shows characteristics of response signals of the neutral point difference voltage as the difference voltage between the actual neutral point CN1 and the virtual neutral point CN2, with respect to the rotor position on application of the rotor position search pulse with the two-phase conduction (from the U-phase coil terminal to the V-phase coil terminal). FIG. 18 shows a characteristic of two cases different in current level of the rotor position search pulse.

In FIG. 18, variations in neutral point difference voltage in the case where the rotor position search pulse current is relatively large is indicated by the solid line X. In FIG. 18, variations in neutral point difference voltage in the case where the rotor position search pulse current is relatively small is indicated by the broken line Y.

FIG. 18 shows that a sub-peak Ps and a sub bottom Bs in the case (solid line X) with the rotor position search pulse current set to high are smaller than a sub-peak Ps and a sub bottom Bs with the rotor position search pulse current set to low (broken line Y).

Accordingly, controlling the rotor position search pulse current value to smaller in the rotor position detection can lead to reduction in size of the response voltage signal at the sub peak and the sub bottom which appear at both ends of the motor coil, thereby contributing to extraction of sampling data enabling further accurate determination of the rotor position.

A sampling pulse for the rotor position detection is described. In principle, the rotor position search pulse is applied by turning on a selected high side drive transistor and a selected low side drive transistor to apply a predetermined voltage between coil terminals only for a predetermined time width. The search command signal generator 25 sets an amplitude of the rotor position search pulse.

In the start mode, the commutation controller 22 turns on in PWM a drive transistor selected for application of the rotor position search pulse according to a pulse from the pulse generator 20 through the PWM controller 21, and turns off it in PWM according to an output from the comparator 23 through the PWM controller 21. Details of this operation are described with reference to FIGS. 19A to 19C.

Figure 19A:
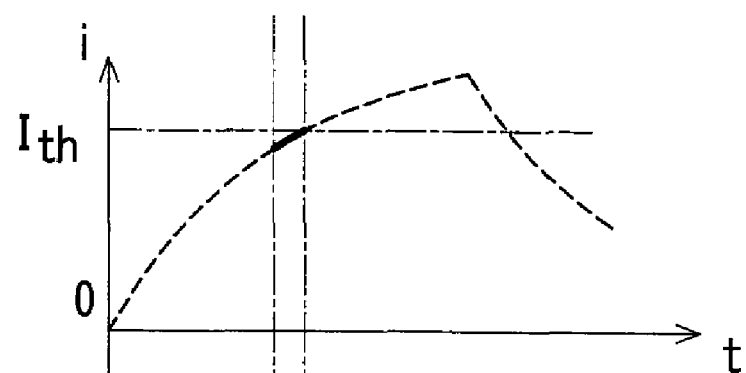
FIGS. 19A to 19E are views for explaining control of an amplitude of the rotor position search pulse.
Figure 19B:
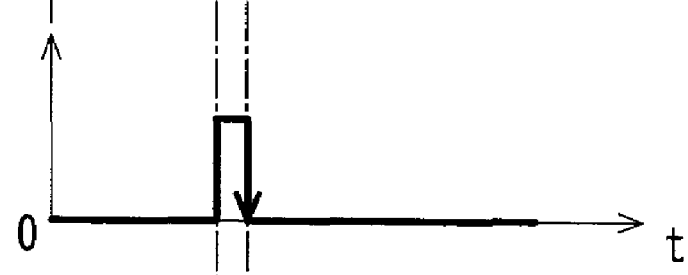
Figure 19C:
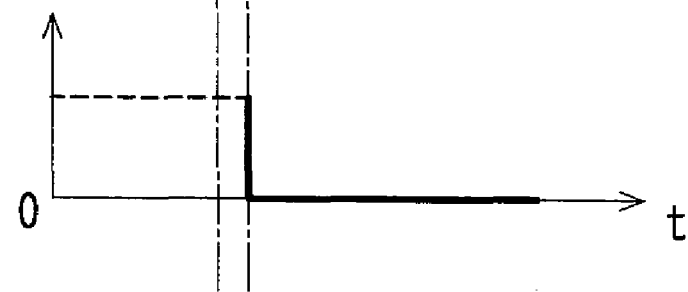

FIG. 19A, 19B and 19C respectively show a rotor position search pulse current, a sampling pulse generated in the rotor position detecting circuit 50, and an output signal of the comparator 23. The rotor position search pulse current is detected with the current detection resistor 28 (see FIG. 19A), and then inputted into the comparator 23 through the current detection amplifier 27. The comparator 23 compares the detection signal of the rotor position search pulse current inputted through the current detection amplifier 27 with a predetermined value Ith set by the search command signal generator 25. When the amplitude of the detection signal reaches the predetermined value Ith at the rising start of the rotor position search pulse current, an off-signal as shown in FIG. 19C is outputted at that timing. Upon receipt of this off-signal, the PWM controller 21 outputs a control signal for turning off to the commutation controller 22. In the rotor position detecting circuit 50, a sampling pulse as shown in FIG. 19B is generated almost in synchronization with a timing at which the amplitude of the detection signal of the rotor position search pulse current reaches the predetermined value Ith.

Namely, after the rotor position detecting circuit 50 has captured sampling data at the timing of generation of the sampling pulse, the rotor position search pulse current is turned off.

When the rotor is located at about 0 degree shown in FIG. 18, in order to prevent the neutral point difference voltage detector 40 from performing erroneous detection of the sub peak with increase in rotor position search pulse current, the sampling pulse is generated at a timing corresponding to a current region where the output of the neutral point difference voltage detector 40 is stabilized. The rotor position detecting circuit 50 samples and stores the output of the neutral point difference voltage detector 40 at the timing of the sampling pulse so that erroneous rotor position determination can be prevented.

Figure 19D:
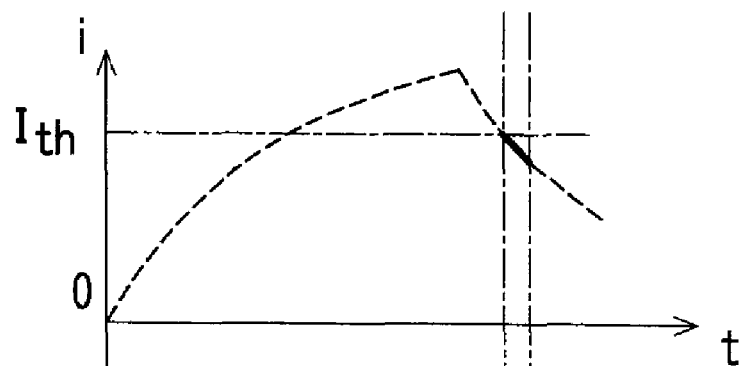
Figure 19E:
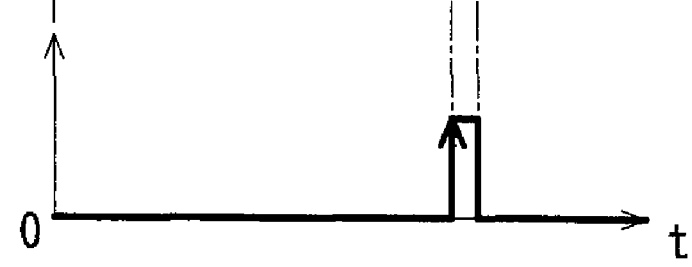

It should be noted that, although the sampling pulse, generated in synchronization with the timing at which the rotor position search pulse current reaches the predetermined value Ith in its rising, is described in FIGS. 19A to 19C, the sampling pulse may be generated in synchronization with a timing at which the rotor position search pulse current reaches the predetermined value Ith in its falling as shown in FIGS. 19D and 19E.

Figure 20A:
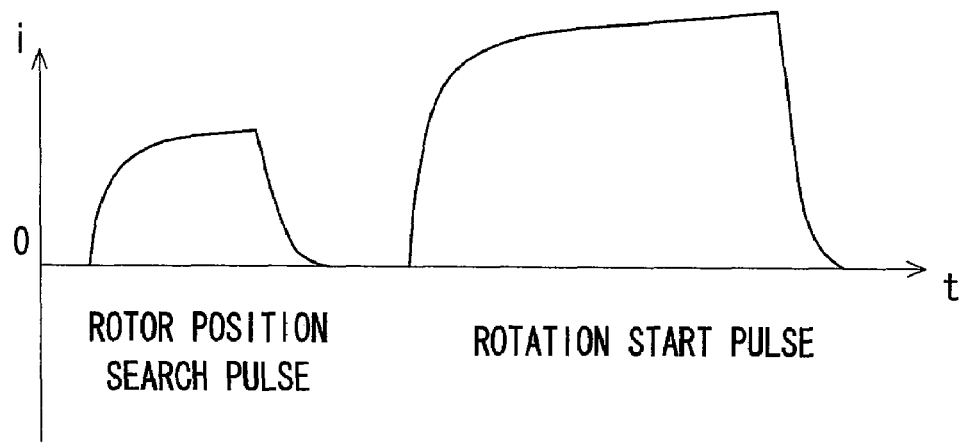
FIGS. 20A and 20B are views explaining a means of applying the rotor position search pulse and the rotation start pulse.
Figure 20B:
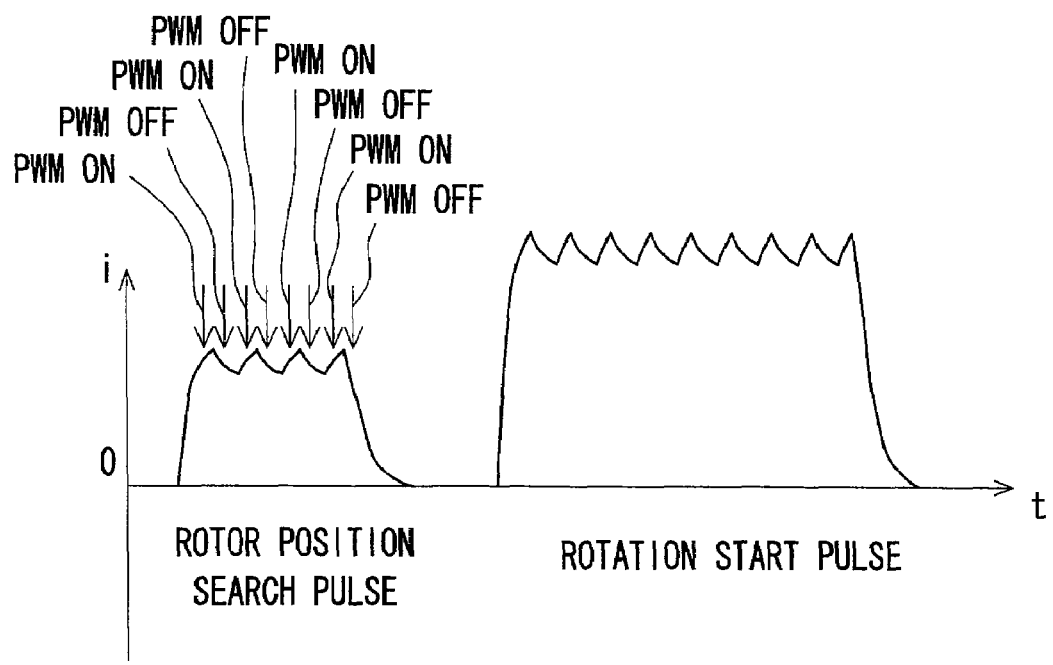

By reference to FIGS. 20A and 20B, how to apply the rotation start pulse is described. In the above description, the rotor position search pulse and the rotation start pulse each includes only one pulse as shown in FIG. 20A. However, when the rotation start pulse is composed of one pulse, a period applying the rotation start pulse becomes long, which may cause an excessive current increase, leading to a reliability problem.

As shown in FIG. 20B, the rotation start pulse can be composed of a plurality of pulses. In this case, a command value from the start command signal generator 26 is compared with a current detection value from the current detection amplifier 27, and when the current detection value reaches the command value from the start command signal generator 26, PWM is turned off, and after the lapse of a predetermined time, PWM is turned on again. It is thereby possible to keep the current at almost constant level so as to maintain reliability.

Further, the search command signal generator 25 sets an amplitude of the rotor position search pulse. Also as to the rotor position search pulse, as shown in FIG. 20B, the rotor position search pulse can be composed of a plurality of pulses by applying PWM-control to the current. Specifically, a command value from the search command signal generator 25 is compared with a current detection value from the current detection amplifier 27, and when the current detection value reaches the command value from the search command signal generator 25, PWM is turned off, and after the lapse of a predetermined time, PWM is turned back on. This is effective in prevention of erroneous detection of the rotor position.

FIGS. 21A to 21E are views explaining application of the rotor position search pulse and the rotation start pulse when the rotation start pulse is composed of a plurality of pulses. FIGS. 21A, 21B and 21C are a U-phase coil current, a V-phase coil current and a W-phase coil current, respectively. FIG. 21D shows output results of polarity determination of E1, E2 and E3. FIG. 21E shows rotor position determination results. This example is the same as the example of FIG. 11 except that the start pulse is composed of a plurality of pulses.

According to the rotation start pulse and the rotor position search pulse of the present embodiment, the number of rotor position search pulses which do not contribute to the torque decreases, and the rotor position search pulse which is PWM-controlled can be applied. Thus, the time for applying the rotation start pulse which is continuously applied increases, and thereby resulting in enhancement of the accelerated speed at the start of the motor.

In the above description, the studies were made on the basis of the response signal in the case where the current tends to increase. However, the rotor position can be detected also in a case where the current tends to decrease. Such a case is described below.

Figure 22:
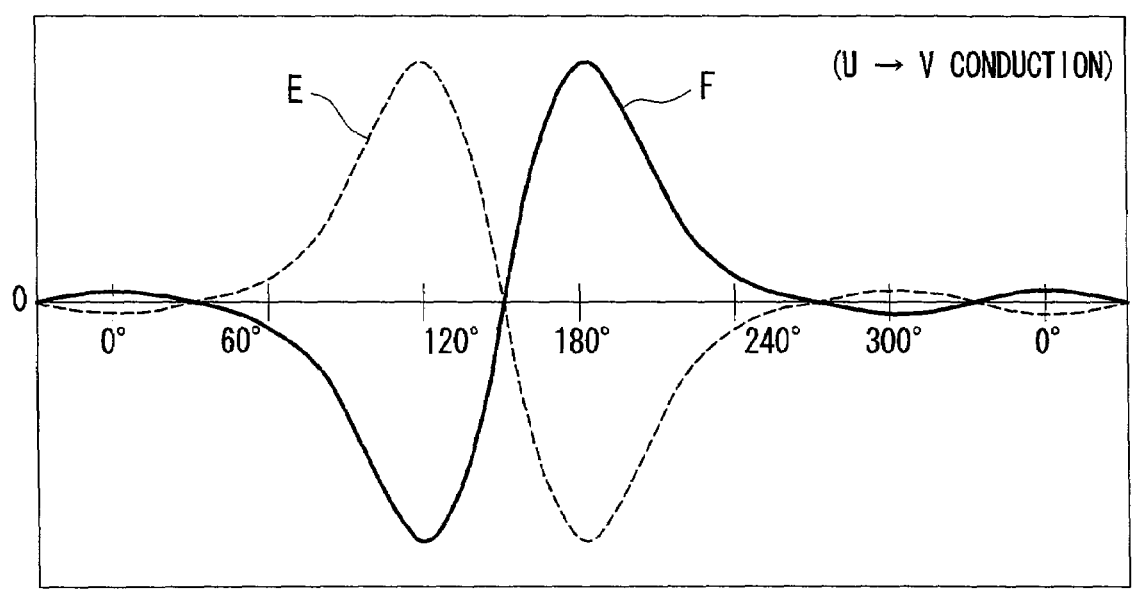
FIG. 22 is a view showing a rotor position dependency of response signals of neutral point difference voltages in cases of an increase and a decrease in current of the rotor position search pulse in application of the rotor position search pulse from the U-phase coil to the V-phase coil.

FIG. 22 is a view showing variations in neutral point difference voltage in respective cases of a decrease and an increase in rotor position search pulse current in application of the rotor position search pulse from the U-phase coil to the V-phase. In this figure, the solid line F indicates variations in response signal of the neutral point difference voltage when the rotor position search pulse current flowing in the direction from the U-phase to the V-phase tends to increase. The broken line E indicates variations in response signal of the neutral point difference voltage when the rotor position search pulse current flowing in the direction from the U-phase to the V-phase tends to decrease.

Since each of these response signals is detected as a product of an inductance and the current change, the response signal of the neutral point difference voltage for the increasing current and the response signal of the neutral point difference voltage for the decreasing current which appear with the rotor located in the same position are opposite in polarity to each other.

It is therefore clear that in FIG. 20B, for example when the rotor position search pulse current is turned off after turned on, the response signals having the opposite polarities can be detected before and after the turning-off, which can be applied to the rotor position search.

In the explanation of FIG. 8, the following was described. For the purpose of detecting movement of the motor from about 240 degrees to about 300 degrees, as a result of polarity determination of E2 as the voltage obtained by addition of the neutral point difference voltages in the case of allowing the rotor position search pulse to flow in the forward direction from the V-phase to the W-phase and in the case of allowing the pulse to flow in the backward direction from the W-phase to the V-phase, the polarity shift from the negative to the positive is detected. However, during the off-period, as a result of polarity determination of E2 as the voltage obtained by addition of the neutral point difference voltages in the case of allowing the rotor position search pulse to flow in the forward direction from the V-phase to the W-phase and in the case of allowing the pulse to flow in the backward direction from the W-phase to the V-phase, the polarity shift from the positive to the negative is detected. This may be applied to the rotor position search.

Embodiment 4

Figure 23:
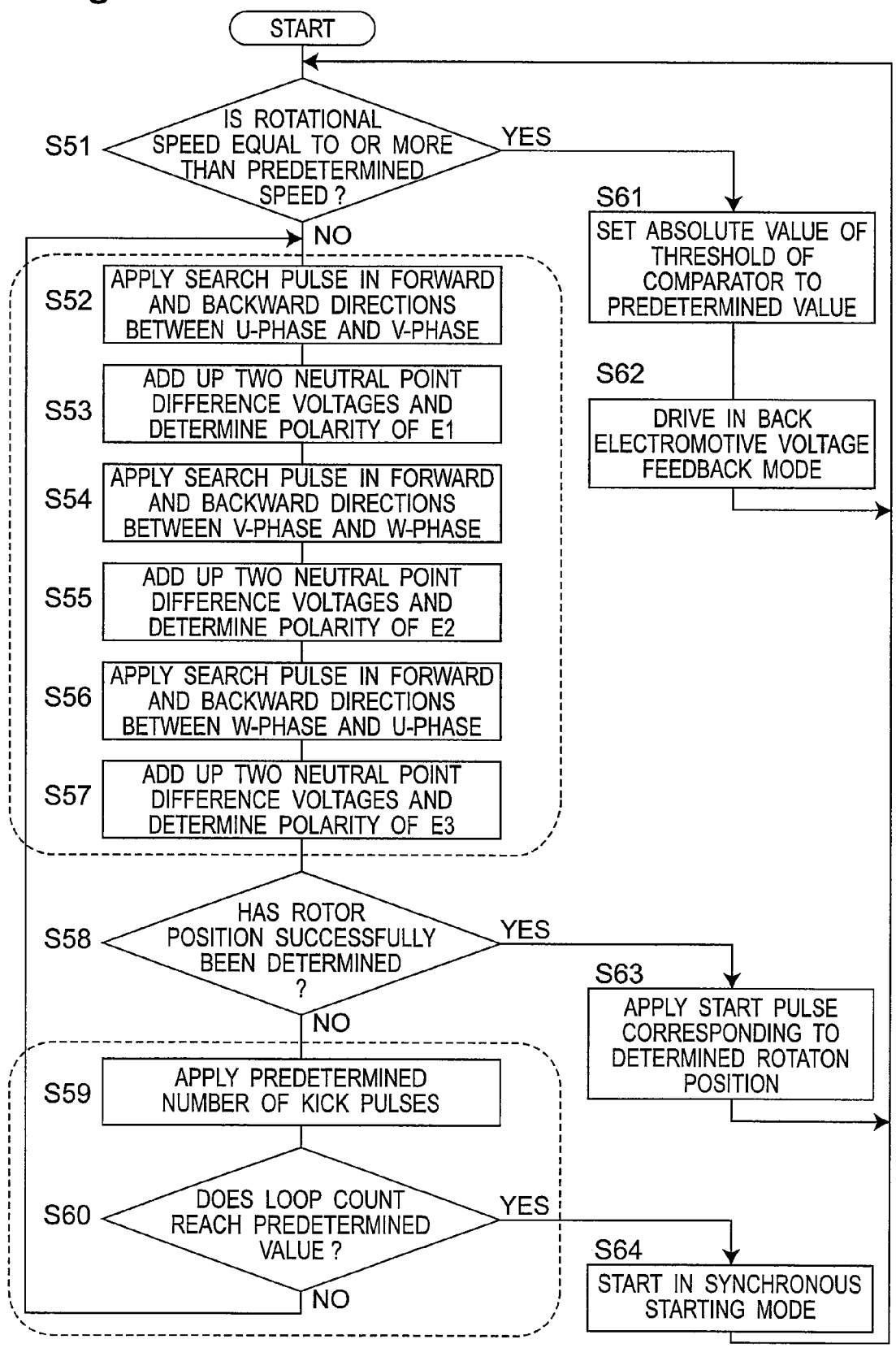
FIG. 23 is a flowchart including a generalized rotor position searching process, a process for transition to a synchronous starting mode at the start of synchronous operation, and a process for switching the operation to the back electromotive voltage feedback mode, in the present invention.

FIG. 23 shows another example of the operational flow of the motor driving apparatus. In the example of FIG. 23, a kick pulse is applied in a retry mode to displace the motor position. Further, when the rotor position cannot be detected even by the retry mode, the motor is shifted to a synchronous start mode for starting the motor by synchronous operation. Moreover, a condition for switching the mode from the searching start mode to the back electromotive voltage feedback mode is that the motor rotational speed is not lower than a predetermined value.

In FIG. 23, when the motor rotational speed is less than the predetermined value, as described above, the current is controlled to sequentially pass through the pairs of phases of the motor coils to obtain added neutral point difference voltages E1, E2 and E3, and polarities thereof are then determined (S52 to S57). The rotor position is determined on the basis of the polarity determination results (S58).

When the rotor position can be determined, a rotor position search pulse on the basis of the determined rotor position is applied (S63). Subsequently, it is determined whether or not the motor rotational speed reaches or exceeds the predetermined value (S51). When the motor rotational speed reaches or exceeds the predetermined value, an absolute value of the threshold of the comparator is set to a predetermined value suitable for operation of the back electromotive voltage feedback mode (S61), to shift the mode to the back electromotive voltage feedback mode (S62).

On the other hand, when the rotor position can not be determined, the mode proceeds to the retry mode. In the retry mode, a predetermined number of kick pulses are applied (S59), and thereafter the rotor position search process is performed again for shifting the rotor position. The number of trials of the retry mode is counted, and when the counted number reaches a predetermined number (S60), the rotor position detection by application of the rotor position search pulse is suspended, and the mode is shifted to the synchronous starting mode for generating a rotational magnetic field at a predetermined rotational speed in the stator to start the motor (S64). In this synchronous starting mode, although the starting speed is low, reliable starting can be realized even with the rotor position being obscure.

In addition, the kick pulse includes a plurality of pulses, and at least one of the pulses is made to certainly apply motor torque which is not smaller than a predetermined level. For example, two kinds of pulses may be applied whose phases are different from each other by 90 degrees. In this case, at least 0.71 torque can be allied with the maximum torque taken as 1. Three kinds of pulses may also be applied whose phases are different from one another by 60 degrees or 120 degrees. In this case, at least 0.87 torque can be applied. Two kinds of pulses may also be applied whose phases are different from each other by 60 degrees or 120 degrees. In this case, at least 0.50 torque can be applied. The pair of pulses whose phases are different by 60 degrees or 120 degrees can be realized by applying a current pulse between two terminals arbitrarily selected out of three phase coil terminals of the motor. The pair of pulses whose phases are different from each other by 90 degrees can be realized in the method in which the current pulse is first applied between two terminals arbitrarily selected out of the three phase coil terminals of the motor and then the current pulse is applied between the two phase coil terminals coupled and the remaining one phase coil terminal.

Embodiment 5

Figure 24:
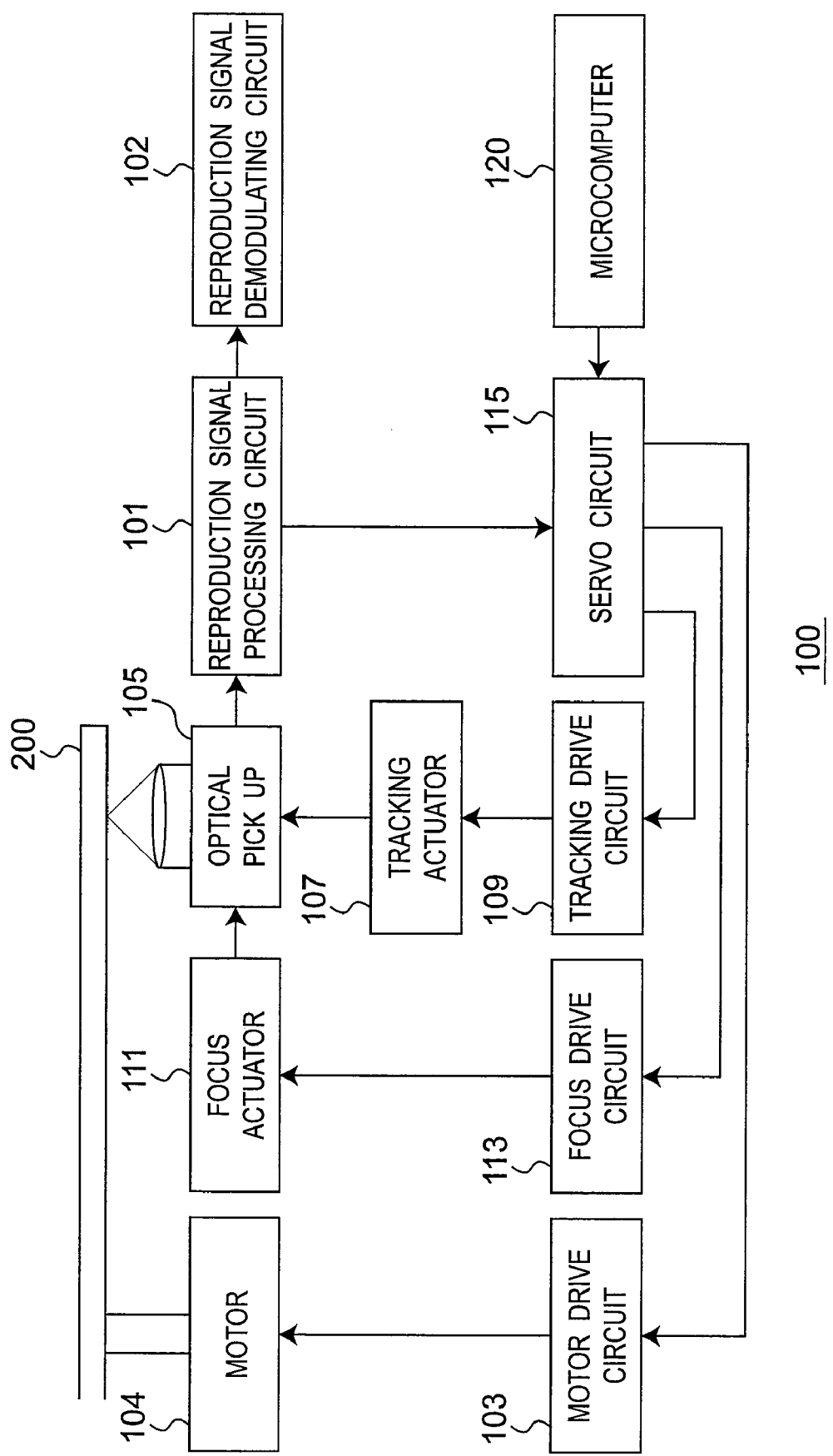
FIG. 24 is a constitutional view of an optical disk system driving apparatus of the present invention.

A disk driving system using the motor driving apparatus described in the above embodiments is described. FIG. 24 shows a configuration of an optical disk driving system 100 as one example of the disk driving system. In the disk driving system 100 shown in FIG. 24, a motor drive circuit 103 corresponds to the motor driving apparatus in the above-mentioned embodiments.

An optical pickup 105 irradiates an optical disk 200 such as a CD (compact disk) or a DVD (digital versatile disk) with optical beams, and outputs information on the optical disk 200 as a reproduction signal to a reproduction signal processing circuit 101 by means of the reflected light. The reproduction signal processing circuit 101 corrects the amplitude of the inputted reproduction signal. A reproduction signal demodulating circuit 102 demodulates the reproduction signal subjected to the amplitude correction to generate the information recorded on the optical disk 200.

A servo circuit 115 controls rotation of a motor 104 through a motor drive circuit 103 such that the optical disk 200 rotates at a rotational speed commanded by a microcomputer 120. The reproduction signal processing circuit 101 generates a focus error signal which is an error signal in a focusing direction of the optical beams, and a tracking error signal which is an error signal in a tracking direction of the optical beam focus.

The servo circuit 115 controls a focus actuator 111 through a focus drive circuit 113 on the basis of the focus error signal generated in the reproduction signal processing circuit 101 such that the optical beam is focused on a recording face of the optical disk 200. Further, the servo circuit 115 controls the optical beam focus in a tracking direction through a tracking drive circuit 109 and a tracking actuator 107 such that the optical beam focus traces the recording track on the optical disk. Such an operation is so called tracking servo.

In the above, some of the embodiments of the present invention are described. According to the above embodiments, in the searching start mode which is a mode for the start of the motor, rotor position determination is performed on the basis of the neutral point difference voltage which is a difference voltage between a neutral point (actual neutral point) of the motor coils and a neutral point (virtual neutral point) of the resistor circuit provided in parallel with the motor coils, to provide an appropriate rotational speed (rotation start torque) at the initial start of the motor. Since the neutral point difference voltage includes no effect of the back electromotive voltage, the neutral point difference voltage enables detection of the rotor position information while being independent of the effect of the back electromotive voltage, thereby ensuring the initial start of the motor. Further, in the searching start mode, sufficient acceleration provided allows subsequent mode shift to the back electromotive voltage feedback mode to be smoothly performed, thereby quickly and reliably starting the motor without rotor position sensors.

Further, at the start of the motor, even when the rotor is located at a dead point where the rotor position detection is impossible, the kick pulse for displacing the rotor position can be imparted to eliminate the dead point, so as to allow reliable motor start.

Moreover, the response signal of the neutral point difference voltage may be detected when the search signal to be imparted for searching the rotor position is present within a predetermined range, and it is thereby possible to perform accurate rotor position determination with the response signal of the neutral point difference voltage having good quality. Further, the neutral point difference voltage detector may include a difference voltage detecting means having the level-shift function, and it is thereby possible to control the range of the input voltage into the AD converter without depending upon the power supply voltage which determines the drive amplitude of the motor driving section, and further to reduce the accuracy and the function of the AD converter.

From the advantages as thus described, the present invention is applicable to the case of requiring self-controllability of the motor, and to the case of a low-cost motor driving system.

Furthermore, in the searching start mode, in the second and subsequent rotor position searching processes, the rotor position search pulse may be applied only to the combination of conduction phases in number smaller than the number of conduction phases in combination selected in the first process. Thereby, it is thereby possible to reduce the starting period until the mode is shifted to the back electromotive voltage feedback mode, so as to improve the starting speed.

The rotor position information by the rotor position search pulse with the two-phase conduction is larger in amount of information of the rotor position detectable region than the rotor position information by the rotor position search pulse with the three-phase conduction. Therefore, occurrence of restart of the motor due to the dead point of the rotor position information can be reduced more by performing the rotor position search with the two-phase conduction than by performing the rotor position search with the three-phase conduction. Thereby, it is possible to reduce the occurrence of restart in the searching start mode and perform starting acceleration by imparting the optimum rotation start torque, so as to quickly and reliably start the motor without the rotor position sensors.

INDUSTRIAL APPLICABILITY

According to the motor driving apparatus and the motor driving method of the present invention, it is possible to perform accurate rotor position determination for achieving stable and high rotational speed, and thus contribute high-speed start of the system. Further, it is also possible to improve the starting speed resistant to variations in load at the start of the motor. Such control is easily realized at low cost, and is extremely useful for a cheap, stable high-performance sensorless motor driving unit.

The specific embodiments of the present invention were described in the present invention. However, many other modified examples, corrections and other applications are apparent for the skilled person in the art. Therefore, the present invention is not limited by the specific disclosure in this specification but can only be limited by the attached claims. The present disclosure relates to subject matter contained in Japanese Patent Application No. 2006-052622, filed on Feb. 28, 2006, which is expressly incorporated herein by reference in its entirety.

What is claimed is:

1. A motor driving apparatus which includes a rotor and a stator having motor coils of a plurality of phases, the motor driving apparatus comprising:
a virtual neutral point unit that has a virtual neutral point, and provides a voltage obtained by averaging motor terminal voltages at the virtual neutral point;
an inverter comprising a plurality of switching elements;
a back electromotive voltage detecting unit operable to detect a back electromotive voltage of the motor;
a neutral point difference voltage detecting unit operable to detect a neutral point difference voltage which is a difference voltage between the virtual neutral point and an actual neutral point which is a common connection point of the motor coils;
a rotor position detecting unit operable to detect a position of the rotor on the basis of the neutral point difference voltage; and
a controller operable to control commutation of the inverter,
wherein the controller has, as operational modes,
a searching start mode for determining conduction phases at the start of the motor on the basis of the detection result by the rotor position detecting unit and energizes the coils of the determined conduction phases; and
a back electromotive voltage feedback mode for controlling commutation on the basis of the back electromotive voltage detected by the back electromotive voltage detecting unit,
the controller alternately performs a rotor position searching process and a rotation start torque applying process in the searching start mode,
the rotor position searching process applies a search pulse for detecting the rotor position in forward and backward directions of at least a pair of conduction phases to detect neutral point difference voltages, and adds up the neutral point difference voltage obtained in the forward direction and the neutral point difference voltage obtained in the backward direction, to determine the rotor position on the basis of a polarity of the added neutral point difference voltage; and
the rotation start torque applying process applies a predetermined rotation torque to the rotor on the basis of the rotor position determined by the rotor position searching process.

2. The motor driving apparatus according to claim 1, wherein,
in a first rotor position searching process, the controller detects neutral point difference voltages with respect to all conduction patterns, judges polarities of the detected neutral point difference voltages, and determines the rotor position on the basis of the polarity determination result, and
in the second and subsequent rotor position searching processes, the controller applies the search pulse only to a pair of conduction phases determined on the basis of the result of polarity determination by the previous rotor position searching process, detects a neutral point difference voltage, and determines the rotor position on the basis of the detected neutral point difference voltage.

3. The motor driving apparatus according to claim 1, wherein the controller further has a retry mode for changing a setting parameter in the case of failure of the rotor position determination in the rotor position searching process, and subsequently performing again the rotor position determination by the rotor position searching process.

4. The motor driving apparatus according to claim 1, wherein the controller further has a retry mode for applying a kick pulse to the motor coil in the case of failure of the rotor position determination in the rotor position searching process, and subsequently performing again the rotor position detection by the rotor position searching process.

5. The motor driving apparatus according to claim 1, wherein the rotor position detecting unit converts the polarity of the added neutral point difference voltage into a logic value, and determines the rotor position using the logic value.

6. The motor driving apparatus according to claim 5, wherein the rotor position detecting unit weights the logic value for each combination of conduction phases, sums the weighted logic values of the conduction phases, and determines the rotor position using the summed value.

7. The motor driving apparatus according to claim 1, further comprising a command unit operable to control a current peak value of the search pulse.

8. The motor driving apparatus according to claim 1, further comprising a command unit operable to control a current peak value of the rotation start pulse.

9. The motor driving apparatus according to claim 1, wherein, when the motor rotating speed exceeds a predetermined value in the searching start mode, the controller shifts the mode to the back electromotive voltage feedback mode.

10. The motor driving apparatus according to claim 1, wherein the neutral point difference voltage detecting unit comprises a differential amplification circuit.

11. The motor driving apparatus according to claim 1, wherein the virtual neutral point unit is connected in parallel to the motor coils, includes a plurality of resistances in common connection, and the common connection point of the resistances is the virtual neutral point.

12. A disk driving system comprising:
a motor for rotating a disk; and
a motor driving apparatus for driving the motor according to claim 1.

13. A motor driving method for driving a motor which includes a rotor and a stator having motor coils of a plurality of phases, the method comprising:
performing a searching start mode which applies a search pulse to the motor coils, determines conduction phases on the basis of a response signal to the applied pulse, and energizes the determined conduction phases; and
performing a back electromotive voltage feedback mode which detects a back electromotive voltage generated in the motor, and controls commutation on the basis of the detected back electromotive voltage,
wherein the searching start mode alternately performs a rotor position searching process and a rotation start torque applying process,
the rotor position searching process applies a search pulse for detecting a rotor position in forward and backward directions of at least a pair of conduction phases, detects each in the forward and backward directions a neutral point difference voltage as a voltage difference between a voltage at a virtual neutral point which is a voltage obtained by averaging motor terminal voltages and a voltage at an actual neutral point which is a common connection point of the motor coils, adds up the neutral point difference voltage obtained in the forward direction and the neutral point difference voltage obtained in the backward direction, and determines the rotor position on the basis of a polarity of the added neutral point difference voltage, and the rotation start torque applying process applies a rotation start pulse for providing a predetermined rotation torque to the rotor on the basis of the rotor position determined by the rotor position searching process.

14. The motor driving method according to claim 13, wherein the added neutral point difference voltage is compared with a predetermined threshold to determine the polarity of the neutral point difference voltage in the searching start mode.

15. The motor driving method according to claim 13, wherein the search pulse is applied to at most three pairs of conduction phases to detect the neutral point difference voltage, only in the first rotor position searching process.

16. The motor driving method according to claim 13, wherein,
in detection of the polarity of the rotor position by the second or subsequent rotor position searching processes, the search pulse is applied to a pair of conduction phases determined on the basis of the polarity of the neutral point difference voltage obtained by the previous rotor position searching process, to obtain a neutral point difference voltage, and a rotor state transition is determined on the basis of the obtained neutral point difference voltage, and
in a case where the rotor state transition is not recognized, in a next rotor position searching process, the search pulse is applied to the pair of conduction phases used for successful detection of the rotor state transition in the previous rotor position searching process.

17. The motor driving method according to claim 13, wherein, in the second or subsequent rotor position searching processes, the search pulse is applied to a pair of conduction phases determined on the basis of the polarity of the neutral point difference voltage obtained by the previous rotor position searching process, to obtain a neutral point difference voltage, and the rotor state transition is determined on the basis of the obtained neutral point difference voltage, and
in a case where the rotor state transition is recognized, in a next rotor position searching process, the search pulse is applied to a pair of conduction phases which enables recognition of the rotor state transition to a next position.

18. The motor driving method according to claim 13, wherein, during the rotor position searching process, in the case of failure of the rotor position detection, a kick pulse is applied for changing the rotor position, and subsequently, the rotor position searching process is performed again.

19. The motor driving method according to claim 18, wherein the kick pulse includes two or three pulses with phases different from one another by a predetermined angle.

20. The motor driving method according to claim 19, wherein the predetermined angle is substantially either one of 90, 60, and 120 degrees.

21. The motor driving method according to claim 13, wherein the rotation start pulse includes a plurality of pulses with current peak values limited to predetermined values.

22. The motor driving method according to claim 13, wherein the search pulse includes a plurality of pulses with current peak values limited to predetermined values.

23. The motor driving method according to claim 13, wherein, when a predetermined times of rotor state transitions are detected in the searching start mode, the mode is shifted to the back electromotive voltage feedback mode.

24. The motor driving method according to claim 13, wherein, when the rotational speed of the motor reaches a predetermined value in the searching start mode, the mode is shifted to the back electromotive voltage feedback mode.

25. The motor driving method according to claim 13, wherein first detection of a back electromotive voltage after the mode shift to the back electromotive voltage feedback mode is performed on the basis of zero-cross timing expected from a commutation period in the searching start mode immediately before the back electromotive voltage feedback mode.

26. The motor driving method according to claim 13, wherein the rotor position is determined on the basis of a neutral point difference voltage at a time when the search pulse current reaches a predetermined value.

* * * * *